United States Patent
Sun et al.

(10) Patent No.: US 11,914,165 B2
(45) Date of Patent: Feb. 27, 2024

(54) METHOD AND DEVICE USING FEMTOSECOND LASER TO PREPARE NANO-PRECISION STRUCTURE

(71) Applicant: JILIN UNIVERSITY, Jilin (CN)

(72) Inventors: Hongbo Sun, Jilin (CN); Zhenze Li, Jilin (CN); Qidai Chen, Jilin (CN)

(73) Assignee: JILIN UNIVERSITY, Jilin (CN)

( * ) Notice: Subject to any disclaimer, the term of this patent is extended or adjusted under 35 U.S.C. 154(b) by 0 days.

(21) Appl. No.: 17/796,506

(22) PCT Filed: Feb. 4, 2021

(86) PCT No.: PCT/CN2021/075338
§ 371 (c)(1),
(2) Date: Jul. 29, 2022

(87) PCT Pub. No.: WO2021/155826
PCT Pub. Date: Aug. 12, 2021

(65) Prior Publication Data
US 2023/0204969 A1 Jun. 29, 2023

(30) Foreign Application Priority Data

Feb. 7, 2020 (CN) .......................... 202010082068.4

(51) Int. Cl.
*B23K 26/0622* (2014.01)
*B23K 26/364* (2014.01)
(Continued)

(52) U.S. Cl.
CPC ........ *G02B 27/286* (2013.01); *B23K 26/0006* (2013.01); *B23K 26/032* (2013.01);
(Continued)

(58) Field of Classification Search
CPC ................... G02B 27/286; G02B 5/30; G02B 2006/12116; B23K 26/0006;
(Continued)

(56) References Cited

U.S. PATENT DOCUMENTS

| 10,774,003 B2* | 9/2020 | Kakehata .................. A61F 2/30 |
| 2014/0168755 A1 | 6/2014 | Clowes et al. |
| 2016/0096233 A1* | 4/2016 | Duan .................. B23K 26/0624 219/121.79 |

FOREIGN PATENT DOCUMENTS

| CN | 203630384 U | 6/2014 |
| CN | 105834589 A * | 8/2016 |

(Continued)

OTHER PUBLICATIONS

Beam expander website, electron6.phys.utk.edu, Jan. 2020 (Year: 2020).*

(Continued)

*Primary Examiner* — Dana Ross
*Assistant Examiner* — Kuangyue Chen
(74) *Attorney, Agent, or Firm* — Peter W. Schroen; Bret E. Field; Bozicevic, Field & Francis LLP

(57) ABSTRACT

A method using femtosecond laser for nano precision preparation. Initial damage nanoholes formed by using femtosecond laser multiphoton excitation are used as a seed structure, and the energy and polarization state of subsequent laser pulses are adjusted in real time, such that uniform and directional optical near-field enhancement is generated near the seed structure and finally the high-precision removal of machined materials is realized. Benefiting from the high localization of near-field spot energy in space, the method uses femtosecond laser pulses having the wavelength of 800 nm to achieve a machining accuracy having the minimum linewidth of only 18 nm, and the linewidth resolution reaches ¹⁄₄₀ of the wavelength; and the method using fem- (Continued)

tosecond laser for nano precision preparation does not need a vacuum environment, having good air/solution machining compatibility.

5 Claims, 5 Drawing Sheets

(51) Int. Cl.
  *B23K 26/082* (2014.01)
  *B23K 26/03* (2006.01)
  *B23K 26/08* (2014.01)
  *B23K 26/06* (2014.01)
  *B23K 26/00* (2014.01)
  *G02B 27/28* (2006.01)
  *G02B 5/30* (2006.01)
  *H01S 3/10* (2006.01)
  *B23K 103/14* (2006.01)
  *B23K 103/00* (2006.01)
  *G02B 6/12* (2006.01)

(52) U.S. Cl.
  CPC ...... *B23K 26/0624* (2015.10); *B23K 26/0643* (2013.01); *B23K 26/0648* (2013.01); *B23K 26/0652* (2013.01); *B23K 26/082* (2015.10); *B23K 26/0853* (2013.01); *B23K 26/364* (2015.10); *G02B 5/30* (2013.01); *G02B 27/283* (2013.01); *H01S 3/10061* (2013.01); *B23K 2103/14* (2018.08); *B23K 2103/54* (2018.08); *G02B 2006/12116* (2013.01)

(58) Field of Classification Search
  CPC ............ B23K 26/0624; B23K 26/0652; B23K 26/082; B23K 26/364; H01S 3/10061
  See application file for complete search history.

(56) References Cited

FOREIGN PATENT DOCUMENTS

| | | | |
|---|---|---|---|
| CN | 106167247 A | 11/2016 | |
| CN | 106552997 A | 4/2017 | |
| CN | 108015410 A * | 5/2018 | ............ B23K 26/00 |
| CN | 108015410 A | 5/2018 | |
| CN | 108788472 A | 11/2018 | |
| CN | 109732201 A | 5/2019 | |
| CN | 110576264 A | 12/2019 | |
| CN | 111168232 A | 5/2020 | |
| JP | 2003066501 A | 3/2003 | |
| JP | 2003211400 A * | 7/2003 | |
| WO | WO2013039668 A1 | 3/2013 | |
| WO | WO2019244120 A2 | 12/2019 | |

OTHER PUBLICATIONS

Almeida et al., Rational design of metallic nanocavities for resonantly enhanced four-wave mixing, May 2015, nature , (Year: 2015).*
Meadowlark, Basic Polarization Techniques and Devices , Jan. 2012 (Year: 2012).*
Wang et al., Polarized second-harmonic generation optical microscopy for laser-directed assembly of ZnO nanowires, Sep. 2019, optics letter (Year: 2019).*
H. Wang et al., Dynamic balance of heat and mass in high power density laser welding, Mar. 2018, Optics Express (Year: 2018).*
JP-2003211400-A (Year: 2003).*
CN-108015410-A (Year: 2018).*
CN-105834589-A (Year: 2016).*
Liu et al., 3D Femtosecond Laser Nanoprinting, Laser & Optoelectronics Progress, 2018, vol. 55, Art. 011410, p. 1-13, and its English abstract.
Cao et al., Application of Micro-Optical Components Fabricated with Femtosecond Laser, Chinese Journal of Lasers, Jan. 2017, vol. 44, No. 1, p. 1-13, and its English abstract.

* cited by examiner

METHOD AND DEVICE USING FEMTOSECOND LASER TO PREPARE NANO-PRECISION STRUCTURE

FIELD OF THE PRESENT DISCLOSURE

The present invention belongs to the technical field of laser processing, and specifically relates to the use of initial damaged nanoholes produced on a surface of a material by femtosecond laser multiphoton excitation as a seed structure, to guide the directional localized near-field enhancement generated near the seed structure by subsequent laser pulses to remove the material, so as to achieve the high-precision laser nanostructure processing in an atmospheric environment.

BACKGROUND OF THE PRESENT DISCLOSURE

The development of modern nanotechnology and quantum technology cannot be achieved without high-precision micro- and nano-level devices, which rely on high-precision micro- and nano-processing technologies for their preparation. The new generation of micro and nano processing technologies that are still under development include Electron Beam Lithography (EBL), Focused Ion Beam (FIB) and the like. Although these processing technologies can provide relatively high processing resolution, their process conditions include extremely high vacuum to ensure the efficient propagation and convergence of high-energy particles. The heavy dependence of these technologies on vacuum conditions limits their process flow and yield, resulting in high manufacturing costs and difficulties in meeting the demand for industrial mass production.

Femtosecond laser processing, as an emerging optical processing technology, has the ability to perform low-cost, rapid micromachining of almost all material surfaces in an atmospheric environment. However, the existing femtosecond laser processing technology is far-field processing, which is limited by the diffraction limit of the focused light spot, its processing accuracy is mostly between microns and hundreds of nanometers, and under far-field processing conditions, only when the lithographic linewidth reaches 200 nm or more, and the line spacing reaches 400 nm or more, stable patterns can be obtained, which is difficult to meet the accuracy of less than 100 nm required by most nanotechnologies. Up to this day, how to increase the resolution of femtosecond laser for material surface removal is still an open problem.

SUMMARY OF THE PRESENT DISCLOSURE

In view of the shortcomings of the prior art, the technical problem to be solved by the present invention is to provide a method using femtosecond laser for nano precision structure preparation so as to obtain lithographic results with a linewidth of nanometer level. According to the method, firstly the femtosecond laser multiphoton excitation is used for forming initial damage nanoholes, which are used as a seed structure, then the energy and polarization state of subsequent femtosecond laser pulses are adjusted and controlled in real time, such that a continuous nano linewidth decorative pattern is formed based on the seed structure by the uniform and directional optical near-field enhancement generated near the seed structure, and the high-precision removal of a material to be processed is realized in the end. Benefiting from the high localization of energy of the focus of the near-field femtosecond laser in space, the method uses femtosecond laser pulses having the wavelength of 800 nm to achieve a machining accuracy having the minimum linewidth of only 18 nm, and the linewidth resolution reaches 1/40 of the wavelength.

In the present application, the lithography is the use of laser to remove materials at specific locations on the surface of the sample to be processed, pits are formed at specific locations on the surface of the sample to be processed, and the pits can be points, or lines or surfaces, and form specific decorative patterns.

Unless otherwise specified, in the present application, the decorative pattern means the same as the pattern, and refers to a macroscopic pattern made up of points, lines or surfaces obtained by lithography, ablation pits refer to points obtained by lithography, and grooves refer to lines obtained by lithography.

The purpose of the present application is to provide the method using femtosecond laser to prepare nano precision structure, which comprises the specific steps of:

(1) leveling of the sample: locating a focus of the femtosecond laser at a plane and a sample-air interface, wherein the sample-air interface is an interface between a surface of the sample to be processed and air;

(2) generation of an initial seed structure: adjusting the single pulse energy of the femtosecond laser to be higher than a material damage threshold $F_{th}$ of the sample to be processed, and controlling the exposure time, such that the seed structure formed on the surface of the sample to be processed is of a preset morphology;

(3) relaxation and stabilization of the seed structure: adjusting the single pulse energy of the femtosecond laser to be lower than the single pulse energy of the femtosecond laser used in the step (2), and continuously depositing multiple femtosecond laser pulses on the initial seed structure obtained in the step (2) until the initial seed structure reaches a stable state, and the seed structure is obtained; and (4) preparation of non-periodic patterns and periodic patterns: maintaining the single pulse energy determined in the step (3) or adjusting the single pulse energy of the femtosecond laser to be lower than the single pulse energy of the femtosecond laser used in the step (3), and adjusting the scanning speed of the focus of the femtosecond laser, such that the focus of the femtosecond laser scans the surface of the sample to be processed gradually in a third preset direction along a preset trajectory, and at a front end of the seed structure, controlling a polarization direction of the focus of the femtosecond laser to be perpendicular to a tangent direction of the focus on a preset decorative pattern.

Unless otherwise specified, in the present application, the initial seed structure is an ablation pit or a groove formed by the femtosecond laser pulse greater than the damage threshold of the material to be processed, and the seed structure is a groove or a surface formed by the femtosecond laser having the single pulse energy lower than that of the femtosecond laser for processing the initial seed structure.

The method provided by the present application uses the seed structure itself as a near-field probe for continuing near-field fabrication without using additional physical near-field probes, e.g., a physical small object such as a nano-tip or nano-particle, which not only reduces the difficulty of controlling the probe displacement, but also can improve the accuracy of lithography and is tolerant to the movement error of the probe. Further, the method provided by the present application can obtain the accuracy of near-field lithography by far-field control, is easy to operate, and does not require the use of complex and expensive optical device, and the cost of lithography is reduced thereupon.

In an achievable embodiment, a device used in the method comprises sequentially in the direction of an optical path: a femtosecond laser device 1, a beam expander 2, an energy modulation system 3, a polarization control system 4, a 4f system 5, a processing objective lens 6 and a motion stage 7, wherein a processing real-time monitoring device 8 for real-time observation of the morphology of the surface of the sample to be processed is also arranged at an incident end of the processing objective lens 6, and the sample to be processed is arranged on the motion stage 7.

Further, the device is also provided with a galvanometer 9 between the polarization control system 4 and the 4f system 5, such that the focus of the femtosecond laser continuously scans the surface of the sample to be processed through the continuous vibration of the galvanometer 9. In the present application, the scanning trajectory and scanning speed of the focus of the femtosecond laser on the surface of the sample to be processed can be adjusted by adjusting the vibration direction and frequency of the galvanometer 9. It can be understood that if the galvanometer 9 is not used, the scanning trajectory and scanning speed of the focus of the femtosecond laser on the surface of the sample to be processed can be controlled by continuously adjusting the motion stage.

According to the present application, the leveling means that the focus of the femtosecond laser is located at the plane and the sample-gas interface. In particular, for a flat sample, a plane formed by the movement of the focus of the femtosecond laser can be made parallel to the sample-air interface, thereby ensuring that the incidence direction of the femtosecond laser is perpendicular to the sample-air interface.

There is a consensus in the industry that a femtosecond laser processing method that can be used for processing flat sheets is also applicable to the processing of non-flat materials, specifically, the scheme provided by the present invention is also applicable to the processing of non-flat samples because the femtosecond laser processing is non-contact processing, and the focus of the femtosecond laser has a certain length in a longitudinal direction, which is generally several microns, or even tens of microns, and therefore, the scheme provided by the present application is not sensitive to the local undulation of the surface of the sample to be processed. In addition, in industrial applications, there are sample tables specifically designed to control the rotation and location of the sample to be processed in space, which can ensure that a processing region of a non-flat sample to be processed is locally and always perpendicular to the beam of the femtosecond laser. Therefore, in the present application, only the flat sheet is used as an example to illustrate the scheme, and for the processing scheme of non-flat samples, those skilled in the art can expect to obtain the same effect.

In an achievable embodiment, the step (1) specifically may comprise:

fixing the sample to be processed to a motion stage with an adjustment device, wherein the motion stage comprises a piezo stage used for precisely adjusting the position of the sample to be processed;

turning on an optical shutter in a processing optical path, and focusing femtosecond laser emitted from a femtosecond laser device on the surface of the sample to be processed through an objective lens, wherein the processing optical path comprises the femtosecond laser device and the optical shutter, and the objective lens is a processing objective lens;

controlling the motion stage to move by a first preset distance in a first direction, and keeping the focus of the femtosecond laser always focused on the sample-air interface in the process of the motion stage moving by the first preset distance, wherein the morphology of the focus of the femtosecond laser on the surface of the sample to be processed remains unchanged; and controlling the motion stage to move by a second preset distance in a second direction, wherein the second direction is not co-linear with the first direction, a plane formed by the second direction and the first direction coincides with or is parallel to an upper surface of the sample to be processed, the focus of the femtosecond laser is always focused on the sample-air interface in the process of the motion stage moving by the second preset distance, and the morphology of the focus of the femtosecond laser on the surface of the sample to be processed remains unchanged.

In an achievable embodiment, both the first preset distance and the second preset distance can be specifically set according to the specifications of the sample to be processed.

In an achievable embodiment, before the single pulse energy of the femtosecond laser is adjusted, the step (2) may comprise: maintaining the position determined in the step (1), and turning on the femtosecond laser device 1, such that the femtosecond laser emitted from the femtosecond laser device 1 passes through the beam expander 2, the energy modulation system 3, the polarization control system 4, the 4f system 5 and the processing objective lens 6 sequentially, and finally is focused on the surface of the sample to be processed.

Optionally, the femtosecond laser beam is emitted by the polarization control system 4, then enters the galvanometer 9 in normal incident, is reflected by the galvanometer 9 and finally enters the 4f system 5.

Optionally, the beam expander 2 may comprise a concave lens L1 and a first convex lens L2 which are sequentially arranged in the direction of the optical path.

Optionally, the energy modulation system 3 comprises a first half-wave plate H1 and a first Glan prism P1 which are sequentially arranged in the direction of the optical path.

Optionally, the polarization control system 4 comprises a second Glan prism P2 and a second half-wave plate H2 which are sequentially arranged in the direction of the optical path, wherein the second Glan prism P2 is used for purifying the polarization state of the laser, and can be removed to simplify the optical path if the polarization state of the laser itself is highly pure.

Optionally, the 4f system 5 may comprise a second convex lens L3 and a third convex lens L4 which are sequentially arranged in the direction of the optical path.

Optionally, the energy modulation system 3 and the polarization control system 4 are also provided with a first total-reflection mirror M1.

Further, in the step (2), the single pulse energy of the femtosecond laser is 100% to 110% of the material damage threshold $F_{th}$ of the sample to be processed.

Further, in the step (2), the preset morphology is a regular morphology, preferably a waist shape or an approximate near-waist shape, such that the obtained structure has a uniform linewidth and a good morphology.

Further, in the step (2), exactly two femtosecond laser pulses are deposited on the surface of the sample to be processed by controlling the exposure time, such that the morphology of the initial seed structure is the preset morphology.

In an achievable embodiment, the step (3) may specifically comprise: based on the initial seed structure formed in the step (2), adjusting the single pulse energy of the femtosecond laser to be lower than the single pulse energy of the femtosecond laser used in the step (2) by the energy modulation system (3) so as to homogenize the near-field energy distribution near the initial seed structure obtained in the step (2).

In particular, in the step (3), the single pulse energy of the femtosecond laser can be specifically selected according to factors such as the material properties, target linewidth, and target morphology of the material to be processed, and for example, the single pulse energy can be reduced to 60% to 110% of the damage threshold $F_{th}$ of the material to be processed for titanium dioxide sheets.

Further, 4 to 16 femtosecond laser pulses are continuously deposited on the initial seed structure obtained in the step (2) by the single-pulse energy of the current femtosecond lase, such that the morphology of the seed structure is continuously relaxed in the process of interacting with the laser and finally reaches a stable state, that is, the morphology of the seed structure changes as expected.

In an achievable embodiment, for multiple seed structures on the same sample to be processed, each seed structure can be prepared in sequence according to the step (2) and the step (3), or can be prepared in turn by steps according to the step (2) and the step (3), and preferably, each seed structure is prepared in sequence according to the step (2) and the step (3) so as to avoid the problem of poor seed structure morphology caused by repeated positioning accuracy.

In an achievable embodiment, in the step (4), the scanning speed of the focus of the femtosecond laser can be specifically set according to the preset linewidth.

Further, in the step (4), the scanning speed of the focus of the femtosecond laser can be 2 μm/s to 50 μm/s.

In an achievable embodiment, for a periodic pattern, the step (4) may comprise:

keeping the single pulse energy of the femtosecond laser determined in the step (3) unchanged or adjusting the single pulse energy of the femtosecond laser to be lower than the single pulse energy of the femtosecond laser used in the step (3), such that the focus of the femtosecond laser scans the surface of the sample to be processed along a serpentine or grating scanning, and on various substructures, enabling a polarization direction of the focus of the femtosecond laser to be perpendicular to a tangent direction of the focus on the preset decorative pattern, thereby realizing the rapid batch preparation of preset decorative patterns with periodic nano linewidths on the surface of the same sample to be processed.

Further, as the morphology of the decorative pattern is comprehensively affected by factors such as the pulse frequency, exposure time and scanning step length of the femtosecond laser, parameters such as the exposure time and scanning step length can be specifically set according to the expected decorative pattern morphology in combination with the pulse frequency of the femtosecond laser, such that the decorative pattern structure can form a continuous and stable linewidth, and the expected decorative pattern morphology is not damaged due to unintended damage caused by overexposure.

In the present embodiment, a preset decorative pattern can be obtained on the surface of the sample to be processed only by adjusting the polarization direction of the focus of the femtosecond laser. As the single pulse energy of the femtosecond laser is lower than the material damage threshold of the sample to be processed, the femtosecond laser can only carry out removal at locations where the seed structures are pre-deposited, that is, only at locations where the directional near-field enhancement can be caused, and no damage is formed on the rest of the sample. That is, the movement trajectory of the focus of the femtosecond laser does not coincide with the pattern of the preset decorative pattern. Specifically, the laser focus always maintains serpentine scanning or grating scanning, and the obtained patterns are periodic personalized decorative patterns.

In an achievable embodiment, for a non-periodic pattern, the step (4) may comprise: keeping the single pulse energy of the femtosecond laser determined in the step (3) unchanged, controlling the focus of the femtosecond laser to move along the preset decorative pattern, and controlling the polarization direction of the femtosecond laser to be perpendicular to a movement direction of the focus of the femtosecond laser.

In an achievable embodiment, the movement trajectory of the laser focus coincides with the trajectory of the pattern.

In an achievable embodiment, the method using femtosecond laser for nano precision structure preparation provided by the present application comprises the specific steps of:

(1) leveling of the sample;

specifically, firstly fixing the sample to be processed to the motion stage with the adjustment device; then turning on the optical shutter in the processing optical path, focusing the laser by the objective lens, and focusing the femtosecond laser on the surface of the sample to be processed by adjusting the height of the motion stage; then controlling the motion stage to move horizontally along the long axis of the sample sheet by 2 cm, and adjusting the adjustment device of the motion stage, such that when the motion stage moves, the laser focus is always focused on the interface between the surface of the sample and the air without relative movement, and the morphology of the light spot in the processing real-time monitoring device remains unchanged; and then controlling the motion stage to move horizontally along the short axis of the sample piece by 2 cm, and adjusting the adjustment device of the motion stage, such that when the motion stage moves, the laser focus is always focused on the sample-air interface without relative movement, and the morphology of the light spot in the processing real-time monitoring device remains unchanged, and at this time, the sample table to be processed has been leveled;

(2) generation of the initial seed structure;

specifically, firstly the femtosecond laser emitted from the laser device is subjected to light spot beam expansion by the beam expander consisting of a concave lens L1 and a first convex lens L2, then passes through the energy modulation system consisting of a first half-wave plate H1 and a first Glan prism P1, and afterwards passes through the first total-reflection mirror M1 and the polarization control system consisting of a second Glan prism P1 and a second half-wave plate H2 sequentially, and a light beam is enabled to vertically enter a galvanometer; then the light beam reflected by the galvanometer passes through the 4f system consisting of a second convex lens L3 and a third convex lens L4, and the light spot entering the galvanometer is projected onto a front of the processing objective lens in a ratio of 1:1, and finally is focused on the surface of the sample to be processed; and the single pulse energy of the laser is adjusted to be within the range of 100% and 110% of the material damage threshold $F_{th}$ of the sample to be processed, and the exposure time is accurately controlled, such that two pulses are exactly deposited on the surface of the sample to complete the preparation of the seed structure;

the present applicant finds that for commonly used materials of samples to be processed, for example, titanium dioxide, fused quartz, etc., if the number of the femtosecond laser pulses is exactly two, the obtained seed structure has exactly moderate stretch and a good morphology, and if a third pulse is continuously formed on the seed structure, an undesired dumbbell morphology is usually produced on the seed structure, which is not conducive to the preparation of the uniform decorative pattern structure;

(3) relaxation and stabilization of the seed structure;

specifically, after completing the generation of the initial seed structure according to the step (2), rotating the angle of the first half-wave plate H1 relative to the first Glan prism P1 in the energy modulation system, such that the energy of subsequent pulses from a third pulse is reduced to 60%-100% (changing according to the difference of processing materials) of the material damage threshold $F_{th}$ so as to homogenize the near-field energy distribution near the initial seed structure; then keeping the single pulse energy of the femtosecond laser at this level, and continuously depositing 4 to 16 pulses (changing according to the difference of processing materials) on the seed structure obtained in the step (2) by controlling the exposure time, such that the morphology of the initial seed structure is continuously relaxed in the process of interacting with the laser and finally reaches a stable state, that is, the morphology of the seed does not change any more; and (4) preparation of non-periodic patterns and periodic patterns;

laser direct writing of high-precision two-dimensional patterns;

specifically, after completing the relaxation and stabilization of the seed structure according to the step (3), rotating the second half-wave plate H2 in the polarization control system to adjust the polarization of the laser entering the objective lens, thereby changing the direction of the near-field enhancement generated at the seed structure; controlling the movement of the focused light spot and the rotation of the laser polarization jointly by a computer to enable the pulse polarization to be always and locally perpendicular to a pre-designed geometric structure, such that the dynamical near-field enhancement can be realized, and then the far-field super-resolution direct laser writing of any given two-dimensional pattern is realized; at this time, the movement of the light spot of the laser and the trajectory of the pattern coincide; meanwhile, adjusting the pulse energy of the laser to be within the range of 60% to 110% of the damage threshold $F_{th}$, preferably within the range of 60% to 100%, adjusting a relative position of the focused light spot and an ablation front by adjusting the scanning speed of the light spot of the laser to change within the range of 2 μm/s to 50 μm/s, and then adjusting the width of a near-field light spot to achieve different direct writing linewidths from 18 nm to 200 nm;

laser printing of high-precision periodic nano grooves:

specifically: reducing the energy of the laser pulse to be 60% to 110% of the material damage threshold, preferably 60% to 100% (changing according to the difference of processing materials), enabling the light spot to perform grating scanning in the periodic direction of a seed array (scanning according to a rectangle, the scanning speed is 2 μm/s-50 μm/s); meanwhile constantly changing the polarization of the laser pulse by using the polarization control system according to the morphology of a preset nano groove, such that in each scanning process, if the laser spot coincides with the seed structure, the laser polarization is exactly perpendicular to the tangent line of the preset nano groove, and thus, large-area periodic nano groove structures can be quickly prepared, and however, no damage occurs at locations where the seed structures are not deposited due to the threshold value. At this time, the movement of the light spot of the laser and the trajectory of the pattern do not coincide, that is, the light spot of the laser maintains the grating scanning all the time, but the polarization of the laser needs to be changed accordingly according to the design structure. As the single pulse energy is reduced below the material damage threshold, the material removal process occurs at and only at locations where the seed structures are pre-deposited, that is, those positions that can cause directional near-field enhancement. For regions where the seed structures are not pre-deposited, subsequent grating scanning do not cause any material damage.

Unless otherwise specified in the present application, the terms "objective lens", "focusing objective lens", "processing objective lens" and "objective lens" all refer to the objective lens at the front of the motion stage used for focusing the femtosecond laser.

Unless otherwise specified in the present application, the term "processing optical path" refers to an optical system formed by each optical component used for realizing the scheme, and comprises the femtosecond laser device, the optical shutter and the lenses.

Unless otherwise specified in the present application, the motion stage is an objective table for loading the sample to be processed, and comprises a sample table for roughly adjusting the distance, and a piezo stage for finely adjusting the distance.

Unless otherwise specified in the present application, the terms "light dot" and "laser spot" used refer to the focus of femtosecond laser.

Unless otherwise specified in the present application, pulse polarization refers to the polarization of the femtosecond laser.

Further, the processing real-time monitoring device described in the step (1) is a microscopic imaging system formed jointly by a camera, a fourth convex lens L5, an illumination light source and a fifth convex lens L6.

Further, the laser emitted by the femtosecond laser in the step (2) has a center wavelength of 800 nm, a pulse width of 150 fs, and a repetition frequency of 1 kHz; after the laser beam is subjected to beam expansion by the concave lens L1 and the first convex lens L2, the diameter of the light spot is enlarged by 2-4 times, such that the diameter of the femtosecond laser beam entering the processing objective lens is greater than or equal to the entrance pupil diameter of the focusing objective lens, thereby ensuring that the numerical aperture of the focusing objective lens is fully utilized; the half-wave plates are 3010030241 air-gap zero-order wave plates produced by Union Optic, Inc., and the Glan prisms are PGL5010 Glan lasers produced by Union Optic, Inc.; and the objective lens used for laser processing is a flat-field achromatic objective lens with a numerical aperture of 0.8 and a magnification of 80 times.

Further, the material damage threshold $F_{th}$ described in the step (2) can be measured by the steps of: adjusting the single pulse energy of the incident laser to $E_1, E_2, \ldots, E_k, \ldots, E_n$ to carry out single pulse ablation on the surface of the material, and measuring the diameters $D_1, D2, \ldots, D_k, \ldots, Dn$ of corresponding ablation pits under an electron microscope. The undetermined coefficient focused Gaussian light spot beam waist wo and the material damage threshold $F_{th}$ can be determined by fitting the relationship between the diameter of the ablation pit and the single pulse energy with the formula $D_k^2 = 2w_0^2[\ln(E_k) - \ln(F_{th})]$.

Further, the scanning speed of 2 μm/s to 50 μm/s in the step (4) is relative to the laser repetition frequency of 1 kHz, which is essentially determined by the spatial deposition distance between two adjacent pulses at fixed intervals. Accordingly, for each X times increase in laser repetition frequency (X between 1 and 10,000), the scanning speed can be correspondingly increased by X times in order to speed up the processing speed.

Further, as the direction of near-field enhancement is determined only by the polarization of the laser, the polarization of the laser for the preparation of the non-periodic and periodic patterns in the step (4) is always perpendicular to the designed local structure. The method using femtosecond laser for nano precision preparation does not require any restriction on the movement of the laser spot, but the most efficient scanning path should be adopted for different patterns; for the non-periodic structures, it is natural to make the movement trajectory of the laser spot coincide with the designed pattern; and while for the periodic structures, the strategy of depositing the seed structure periodically before grating scanning can greatly speed up the preparation of the structure.

The present disclosure also provides a device using the femtosecond laser to prepare nano precision structure. The device comprises sequentially in the direction of the optical path: the femtosecond laser device 1, the beam expander 2, the energy modulation system 3, the polarization control system 4, the 4f system 5, the processing objective lens 6 and the motion stage 7, wherein the processing real-time monitoring device 8 for real-time observation of the surface morphology of the sample to be processed is also arranged at an incident end of the processing objective lens 6.

In an achievable embodiment, the beam expander 2 may comprise the concave lens L1 and the first convex lens L2 which are sequentially arranged in the direction of the optical path.

In an achievable embodiment, the energy modulation system 3 comprises the first half-wave plate H1 and the first Glan prism P1 which are sequentially arranged in the direction of the optical path.

In an achievable embodiment, the polarization control system 4 comprises the second Glan prism P2 and the second half-wave plate H2 which are sequentially arranged in the direction of the optical path, wherein the second Glan prism P2 is used for purifying the linear polarization of the laser, and can be removed so as to further reduce the size of the device if the linear polarization of the laser itself is highly pure.

In an achievable embodiment, the 4f system 5 may comprise the second convex lens L3 and the third convex lens L4 which are sequentially arranged in the direction of the optical path.

In an achievable embodiment, the first total-reflection mirror M1 can also be arranged between the energy modulation system 3 and the polarization control system 4, thus, the direction of the optical path is changed, the distribution of systems and apparatuses in the device is more concentrated, and the overall size of the device is reduced.

In an achievable embodiment, the galvanometer 9 may also be arranged between the polarization control system 4 and the 4f system 5.

In an achievable embodiment, a second reflection mirror M2 may also be arranged between the 4f system 5 and the processing objective lens 6, thus, the direction of the optical path is changed, the distribution of the systems and the apparatuses in the devices is more concentrated, and the overall size of the device is reduced.

In an achievable embodiment, the processing real-time monitoring device 8 comprises: an image acquisition component and a light supplement component, wherein the image acquisition component is used for real-time online observation of the structure of the sample, and may specifically comprise a CCD camera or a CMOS camera, a fourth convex lens L5 and a third reflector M3. The light supplement component is used for supplying light to the surface of the sample to be processed for convenience of observation, and may specifically comprise the illumination source, a fifth convex lens L6 and a fourth reflector M4, wherein the light which is emitted from the illumination source, is reflected by the fourth reflector M4 and then enters the objective lens, the light from the surface of the sample to be processed which passes through the objective lens and then is reflected by the third reflector M3 to the camera, and the light obtained after the femtosecond laser is reflected by the second reflector M2 are coaxial.

Compared with the prior art, the present invention has the following advantages:

(1) compared with processing means such as electron beam lithography (EBL) and focused ion beam (FIB), the method using femtosecond laser for nano-precision preparation provided by the present invention does not require a vacuum environment and has good atmospheric/solution processing compatibility; it is understood that solution and air are essentially the same, and both can be regarded as a continuous medium with a uniform refractive index n; for the femtosecond laser, any propagation medium has a breakdown threshold $F_{th}$, that is, if the light field of the femtosecond laser is strong enough, either solution or air can be broken down by the femtosecond laser to achieve processing of the surface of the sample to be processed, and therefore, as long as the femtosecond laser breakdown threshold of a material covering the surface of the sample to be processed is greater than the femtosecond laser breakdown threshold of the material to be processed, the scheme provided by the present application can be applied;

(2) the scheme provided by the present application can be used for rapid printing of large-area periodic micro-nano structures by means of the combination of parallel deposition seed structures and grating scanning, can effectively reduce the manufacturing cost of devices and is more suitable for industrial production;

(3) compared with conventional femtosecond laser material removal technologies, the present invention greatly improves the accuracy by inducing directional near-field enhancement while retaining the advantages of conventional femtosecond laser processing, and obtains a linewidth resolution greater than 1/40 of the laser wavelength;

(4) compared with other micro-nano machining methods, the femtosecond laser induced directional near-field enhancement is decided by the laser polarization, the movement trajectory of the light spot, and an existing seed structure simultaneously, and therefore, the directly written nano pattern is not sensitive to slight errors of polarization, the movement trajectory of the light spot or a movement platform during processing, and has very strong robustness;

(5) the method provided by the present application can use the femtosecond laser with a wavelength of 800 nm-1 μm for high-precision deep nano-processing, and obtains lithographic results with linewidths and line spacing at the nanometer level, with a minimum of only a dozen nanometers and arbitrary orientation; and (6) the number of optical components used in the device provided by the present application is small, the optical components are all commonly used, the overall structure and the optical path are simple and easy to achieve, and the device is small in overall volume, low in manufacturing cost and easy to promote.

Figure 1:
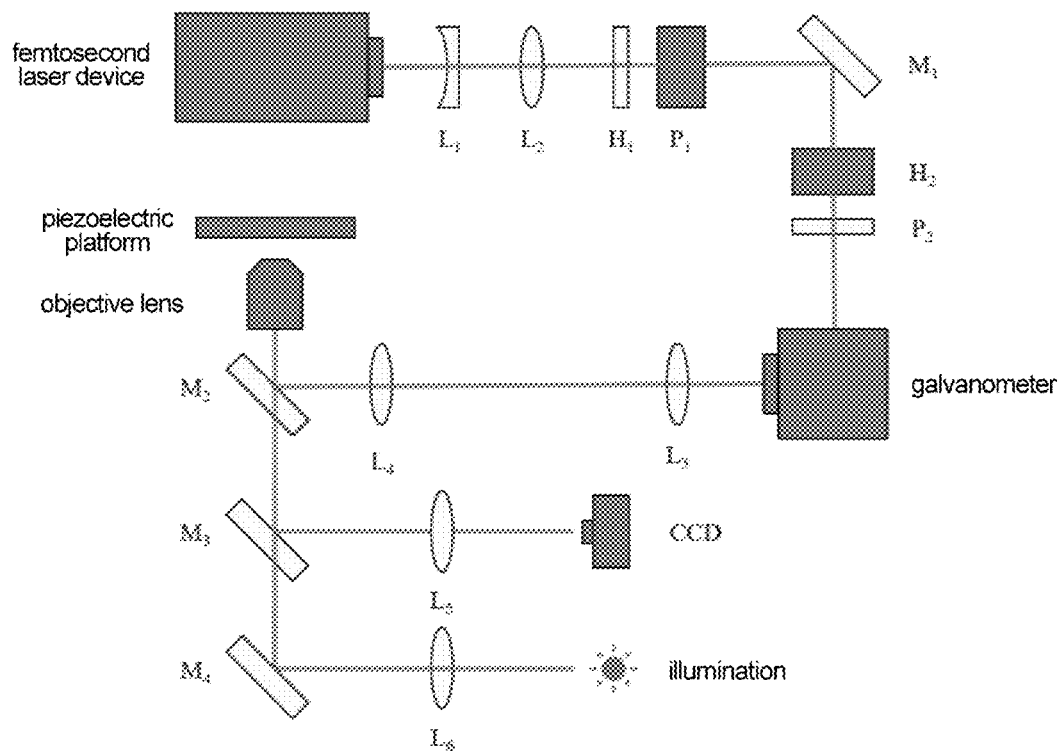
FIG. 1 is an optical path schematic diagram according to a method using femtosecond laser for nano precision preparation provided by the present invention, wherein L1 refers to the concave lens, L2 refers to the first convex lens, L3 refers to the second convex lens, L4 refer to the third convex lens, L5 refers to the fourth convex lens, L6 refers to the fifth convex lens, M1 refers to the first reflector, M2 refers to the second reflector, M3 refers to the third reflector, M4 refers to the fourth reflector, CCD refers to the camera, H1 refers to the first half-wave plate, H2 refers to the second half-wave plate, P1 refers to the first Grand Prism, and P2 refers to the second Galan Prism.

LIST OF REFERENCE NUMERALS IN THE DRAWINGS 1 femtosecond laser device
2 beam expander
3 energy modulation system
4 polarization control system
5 4f system
6 processing objective lens
7 motion stage
8 processing real-time monitoring device
9 galvanometer

DESCRIPTION OF THE EMBODIMENTS

Exemplary embodiments will be described in detail herein, examples of which are illustrated in the accompanying drawings. The following description refers to the accompanying drawings in which the same numbers in different drawings represent the same or similar components unless otherwise represented. The implementations set forth in the following description of exemplary embodiments do not represent all implementations consistent with the present invention. Instead, they are merely examples methods consistent with aspects related to the present invention as recited in the appended claims.

The method and device using the femtosecond laser to prepare nano precision structure provided by the present invention will be described in detail below through specific embodiments.

First of all, the usage scenarios of the scheme are briefly introduced.

Fabrication with the femtosecond laser is used for removing the surface of a material in the far field; the surface of the sample to be processed is etched to obtain a preset decorative pattern on the surface of the sample to be processed; and as the far-field fabrication is usually limited by the diffraction limit, the linewidth of the obtained decorative pattern is at least 200 nm or more, the line spacing is 400 nm or more, and the overall structure size of the decorative pattern will reach tens of microns. Therefore, for more elaborate nano processing of the material, a method of fabrication the surface of the material in the near field is usually used.

In the prior art, the device carrying out fabrication in the near field, that is, a lithography head of a near-field lithography machines has an extremely thin physical probe; and after an excitation light source is illuminated on the physical probe, the physical probe is used for exciting the near-field light, then the near-field light is used for fabrication, and the decorative pattern obtained by fabrication is the same as the movement trajectory of the physical probe.

As the near-field is the local field, the distance between a tip of the physical probe and the surface of the sample to be processed needs to be kept below 100 nm in real time in the fabrication process. In the process of relative movement between the tip of the physical probe and the surface of the sample to be processed, it is extremely difficult to accurately control the distance between the tip of the physical probe and the surface of the sample to be processed in real time to be constant at the above-mentioned nanometer level, which not only requires the assistance of high-cost precision optical components, but also is difficult in accurate control, even more difficult in accurate control for the surfaces of uneven samples to be processed.

The inventor of the present application breaks through the routine in the field, no longer uses the physical probe, but uses a seed structure formed on the surface of the sample to be processed as a probe, and uses the femtosecond laser with the specific polarization direction to perform photolithography, and a pattern with a preset decorative pattern is prepared on the surface of the sample to be processed. According to the method provided by the present application, there is no strict requirement on the distance between the light source and the sample to be processed in the lithography process, and it is also not necessary that the movement trajectory of the light source is strictly consistent with the preset pattern. Therefore, the device provided by the present application does not need the use of high-precision optical components, and has low manufacturing cost.

FIG. 1 is a structural schematic diagram of the device used in the present invention. As shown in FIG. 1, the device comprises sequentially in the direction of an optical path: a femtosecond laser device 1, a beam expander 2, an energy modulation system 3, a polarization control system 4, an 4f system 5, a second reflector M2, a processing objective lens 6 and a motion stage 7, wherein a processing real-time monitoring device 8 for real-time observation of the surface morphology of the sample to be processed is also arranged at an incident end of the processing objective lens 6.

In the present embodiment, the femtosecond laser device 1 is used for emitting the femtosecond laser, and any femtosecond laser device in the prior art can be adopted.

In the present embodiment, the beam expander 2 is used for carrying out beam expansion on the femtosecond laser emitted from the femtosecond laser device, such that the femtosecond laser is homogenized, and the diameter of the beam of the femtosecond laser is greater than the diameter of the objective lens so as to make full use of the numerical aperture of the objective lens.

According to the present application, the specific structure of the beam expander is not particularly limited, any beam expander in the prior art can be adopted, and for example, the beam expander 2 may comprise a concave lens L1 and a first convex lens L2 which are sequentially arranged in the direction of the optical path.

In the present embodiment, the energy modulation system 3 is used for regulating the single pulse energy of the femtosecond laser, and specifically, the energy modulation system 3 may comprise a first half-wave plate H1 and a first Glan prism P1 which are sequentially arranged in the direction of the optical path.

In present embodiment, the polarization control system 4 is used for adjusting the polarization direction of the femtosecond laser, and specifically, the polarization control system 4 may comprise a second Glan prism P2 and a second half-wave plate H2 which are sequentially arranged in the direction of the optical path.

In the present embodiment, the 4f system 5 is used for movably projecting a femtosecond laser spot caused by the movement of the galvanometer onto an entrance of the objective lens so as to control the movement trajectory of the femtosecond laser spot on the surface of the sample to be processed, and specifically, the 4f system 5 may comprise a second convex lens L3 and a third convex lens L4 which are sequentially arranged in the direction of the optical path.

As shown in FIG. 1, the first total-reflection mirror M1 may also be arranged between the energy modulation system 3 and the polarization control system 4, thus, the direction of the optical path is changed, the distribution of systems and apparatuses in the device is more concentrated, and the overall size of the device is reduced.

It can be understood that the first total-reflection mirror M1 may not be provided. If the first total-reflection mirror M1 is not provided, the overall structure of the device changes, but the functions and effects achieved by the device are unchanged.

As shown in FIG. 1, the galvanometer 9 may also be arranged between the polarization control system 4 and the 4f system 5. The galvanometer 9 is used for continuously moving the femtosecond laser spot on the surface of the sample to be processed.

It can be understood that the galvanometer 9 may be not provided. If the galvanometer 9 is not provided, the scanning speed and scanning trajectory of the femtosecond laser spot on the surface of the sample to be processed can be continuously controlled by continuously changing the relative position of a sample table and the objective lens.

Based on operation complexity and operation accuracy, the present application is preferably provided with the galvanometer 9.

In an achievable embodiment, a second reflection mirror M2 may also be arranged between the 4f system 5 and the processing objective lens 6, thus, the direction of the light path is changed, the distribution of the systems and apparatuses in the device is more concentrated, and the overall size of the device is reduced.

It can be understood that the second total-reflection mirror M2 may not be provided, and if the second total-reflection mirror M2 is not provided, the overall structure of the device changes, but the functions and effects achieved by the device are unchanged.

As shown in FIG. 1, the processing real-time monitoring device 8 comprises an image acquisition component and a light supplement component. The image acquisition component is used for real-time online observation of the structure of the sample, and may specifically comprise a camera, a fourth convex lens L5 and a third reflector M3. The light supplement component is used for supplying light to the surface of the sample to be processed for convenience of observation, and may specifically comprise an illumination source, a fifth convex lens L6 and a fourth reflector M4. The light which is emitted from the illumination source, is reflected by the fourth reflector M4 and then enters the objective lens, the light from the surface of the sample to be processed which passes through the objective lens and then is reflected by the third reflector M3 to the camera, and the light obtained after the femtosecond laser is reflected by the second reflector M2 are coaxial.

In present embodiment, the operating state of each component in the device can be remotely controlled by a computer, or the operating state of each component can be controlled by adjusting its own adjustment device. For example, the femtosecond laser device can be remotely controlled by a computer to be turned on or turned off; and the opening degree of the energy control system 3 can be remotely controlled by the computer, that is, the energy value of the laser after passing through the energy modulation system 3 can be remotely controlled by the computer.

The method using the femtosecond laser to prepare nano precision structure specifically comprises the following step (1) to step (4):

Step (1): Leveling of the Sample.

In present embodiment, for a flat sheet-like sample to be processed, if a plane formed by the movement of the femtosecond laser focus coincides with the sample-air interface, the sample to be processed is considered to be leveled, wherein the sample-air interface is the interface between an upper surface of the sample sheet to be processed and the air.

Non-flat samples to be processed, for example, samples with undulate surfaces or spherical surfaces to be processed, are partially leveled in a processing region, or the femtosecond laser beam is enabled to be approximately perpendicular to a region to be processed.

For the flat sheet-like samples to be processed, the step specifically comprises the following step 1-1 to step 1-4:

step 1-1: fixing the sample to be processed to a motion stage, wherein the motion stage comprises a piezo stage used for precisely adjusting the position of the sample to be processed;

step 1-2: turning on the femtosecond laser device, wherein the femtosecond laser emitted from the femtosecond laser device is focused on the surface of the sample to be processed through the objective lens;

step 1-3: controlling the motion stage to move by a first preset distance in a first direction, and keeping the focus of the femtosecond laser always focused on the sample-air interface in the process of the motion stage moving by the first preset distance, wherein the morphology of the focus of the femtosecond laser on the surface of the sample to be processed remains unchanged; and step 1-4: controlling the motion stage to move by a second preset distance in a second direction, wherein the second direction is not co-linear with the first direction, a plane formed by the second direction and the first direction coincides with or is parallel to an upper surface of the sample to be processed, the focus of the femtosecond laser is always focused on the sample-air interface in the process of the motion stage moving by the second preset distance, and the morphology of the focus of the femtosecond laser on the surface of the sample to be processed remains unchanged.

In the step, both the first preset distance and the second preset distance can be specifically set according to the specifications of the sample to be processed.

Step (2): Generation of the Initial Seed Structure.

In present embodiment, an initial seed is a damage pit formed by the femtosecond laser on the surface of the sample to be processed for the first time or the first few times, has a regular structure, and for example, can be circular or oval or waist-shaped, and the morphology of the initial seed can be controlled by the single pulse energy and pulse number of the femtosecond laser.

The step (2) specifically comprises: maintaining the positions of the sample to be processed and the objective lens determined in the step (1), and turning on the femtosecond laser device 1, such that the femtosecond laser emitted from the femtosecond laser device 1 passes through the beam expander 2, the energy modulation system 3, the polarization control system 4, the 4f system 5 and the processing objective lens 6 sequentially, and finally is focused on the surface of the sample to be processed.

In order to make the femtosecond laser damage the surface of the material to be processed, the single pulse energy of the femtosecond laser is adjusted in the present step to be higher than the material damage threshold $F_{th}$ of the sample to be processed.

Figure 2:
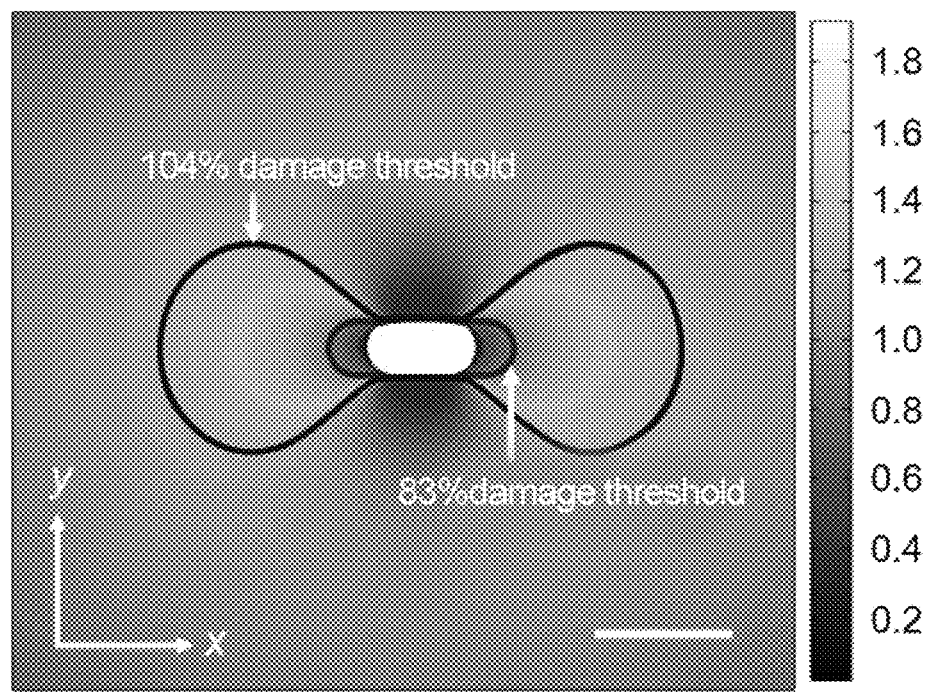
FIG. 2 is a theoretical calculation diagram of near-field distribution near a seed structure located on the surface of titanium dioxide according to the method using femtosecond laser for nano precision preparation provided by the present invention; wherein two contour lines respectively mark the morphologies of ablated regions when the pulse laser energy is respectively 104% and 83% of the damage threshold of the titanium dioxide surface, and a laser pulse is linear-polarized light along the y-axis; wherein a scale in the figure is 50 nm.

FIG. 2 shows a theoretical calculation chart of the near-field energy distribution adjacent to the seed structure with a scale of 50 nm. The sample to be processed in FIG. 2 is a titanium dioxide sample. In FIG. 2, the contour lines of the outer circle of the seed structure form a first closed region, the contour lines of the inner circle of the seed structure form a second closed region, wherein the first closed region is the morphology of the region ablated under the condition that the single pulse energy of the femtosecond laser of the first closed region is 104% of the damage threshold of the titanium dioxide surface, the second closed region is the morphology of the region ablated under the condition that the single pulse energy of the femtosecond laser of the second closed region is 83% of the damage threshold of the titanium dioxide surface, and the laser pulse is linearly polarized light along the y-axis.

The present applicant finds that if the single pulse energy of two initial femtosecond laser pulses used for generating the seed structure is 100% to 110% of the material damage threshold $F_{th}$ of the sample to be processed, and the single pulse energy of subsequent pulses is controlled to be lower than the single pulse energy of the current femtosecond laser pulse, the initial seed structure with a good morphology can be formed on the surface of the sample to be processed. For example, as shown in (a), (b), (f) and (g) of FIG. 3, for a titanium dioxide sample to be processed, the exposure time is controlled, such that exactly two femtosecond laser pulses are deposited on the surface of the sample to be processed, and the obtained initial seed structure is a linear structure with a uniform linewidth.

In present embodiment, the term good morphology means uniform linewidth and no abnormal morphology such as a dumbbell shape.

The present applicant finds that the material damage threshold is affected by the properties of the material itself as well as a preparation method, the material damage threshold may be different even for the same materials from different production batches, and therefore, it is preferable to use measured values rather than empirical values for the material damage threshold.

In present embodiment, the material damage threshold $F_{th}$ may be measured by the following steps of:

adjusting the single pulse energy of the incident laser to $E_1, E_2, \ldots, E_k, \ldots, E_n$ to carry out single pulse ablation on the material surface, measuring the diameters $D_1, D_2, \ldots, D_k, \ldots, D_n$ of the corresponding ablation pits under an electron microscope, and then fitting the relationship between the diameter of the ablation pit and the single pulse energy according to the following formula (I):

$$D_k^2 = 2w_0^2[ln(E_k) - ln(F_{th})] \quad \text{formula (1)};$$

and determining the undetermined coefficient focused Gaussian light spot beam waist $w_0$ and the material damage threshold $F_{th}$ by fitting the relationship between the diameter of the ablation pit and the single pulse energy.

Step (3): The Relaxation and Stabilization of the Seed Structure.

Figure 3:
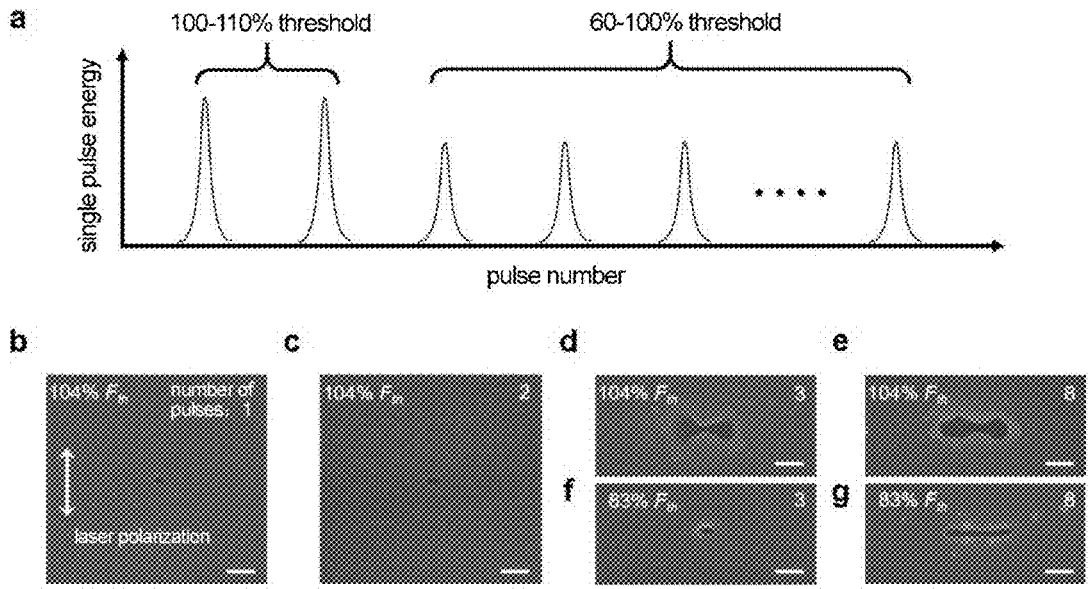
FIG. 3 is a schematic diagram of energy modulation and the effect of energy on the morphology of the seed structure according to the method using femtosecond laser for nano precision preparation provided by the present invention; wherein (a) is a schematic diagram of pulse-resolved energy modulation, (b-c) are electron microscope images of the initial seed structure on the titanium dioxide when the single pulse energy is selected to be 104% of the damage threshold of the titanium dioxide; (d-e) are relaxation and stabilization of the seed structure when the single pulse energy is maintained at 104% of the damage threshold of the titanium dioxide; (g-f) are relaxation and stabilization of the seed structure when the subsequent pulse energy is reduced to 83% of the damage threshold of the titanium dioxide; all scales in (b-f) are 100 nm.

In present embodiment, if there is no special explanation, the following sample to be processed is a titanium dioxide sheet as an example for experiments and explanations. FIG. 3 shows the effect of an energy modulation method and energy magnitude on the morphology of the seed structure according to the method provided by present embodiment, wherein all scales in (b) to (f) are 100 nm.

(a) shows a schematic diagram of a single pulse energy modulation method. As shown in (a) of FIG. 3, in the present embodiment, in the process of forming the initial seed structure and relaxing and stabilizing the initial seed, the single pulse energy of first and second femtosecond laser pulses is 100% to 110% of the material damage threshold. Starting from a third pulse, the single pulse energy of each femtosecond laser pulse is constant and can be specifically set according to the target linewidth. It can be understood that the wider the target linewidth, the higher the single pulse energy, and the narrower the target linewidth, the lower the single pulse energy. Particularly, the present applicant finds that if the linewidth of the target linewidth is controlled to be less than 100 nm, or even less than 50 nm, the single pulse energy of the femtosecond laser pulse needs to be controlled to be 60%-110% of the material damage threshold, preferably 60%-100%.

(b) shows an electron microscope image of the initial seed structure formed on the titanium dioxide sheet by the first femtosecond laser pulse under the condition that the single pulse energy of the femtosecond laser is 104% of the titanium dioxide damage threshold. As shown in (b) of FIG. 3, the initial seed structure formed on the titanium dioxide sheet by the first femtosecond laser pulse is approximately circular.

(c) shows an electron microscope image of the initial seed structure formed on the titanium dioxide sheet by the second femtosecond laser pulse under the condition that the single pulse energy of the femtosecond laser is 104% of the titanium dioxide damage threshold. As shown in (c) of FIG. 3, the initial seed structure formed on the titanium dioxide sheet by the second femtosecond laser pulse is approximately waist-shaped.

(d) shows an electron microscope image of a seed structure obtained after continuously relaxing and stabilizing three times based on the initial seed structure shown in (c) under the condition that the single pulse energy of the femtosecond laser is maintained at 104% of the titanium dioxide damage threshold. As shown in (d) of FIG. 3, if the single pulse energy higher than the damage threshold of the material to be processed is continuously used, the seed structure obtained by fabrication is unexpected dumbbell-shaped.

It can be understood that (d) of FIG. 3) is the result obtained by conducting experiments with the titanium dioxide as an example, and if the seed structure is prepared with other materials or with the single pulse energy of other femtosecond laser, a non-desirable dumbbell shape may be formed after a second femtosecond laser pulse, or after a third or even more femtosecond laser pulses.

(e) shows an electron microscope image of a seed structure obtained after continuously relaxing and stabilizing eight times based on the seed structure shown in (d) under the condition that the single pulse energy of the femtosecond laser is maintained at 104% of the titanium dioxide damage threshold. As shown in (e) of FIG. 3, if the single pulse energy higher than the damage threshold of the material to be processed is continuously used, the seed structure obtained by fabrication has an irregular linewidth and a morphology far from the morphology of the ideal seed structure.

It can be seen from (b) and (c) of FIG. 3 that an initial seed structure with a thinner linewidth can be obtained on the surface of the sample to be processed by using the femtosecond laser with the relatively lower single pulse energy. According to the principle of near-field optics, the smaller the initial seed structure, the stronger its ability to couple near-fields, such that the intensity of the near fields is greater. Keeping the original single pulse energy leads to too high energy, such that the seed structure is in a non-ideal shape, for example, in the present embodiment, a dumbbell shape as shown in (b) and (c) of FIG. 3 is formed.

It is generally believed that only the single pulse energy of the femtosecond laser energy higher than or equal to the damage threshold of the material to be processed is likely to damage the surface of the material to be processed, and thus, the decorative patterns are formed.

The applicant breaks through the conventional idea that in the relaxation process of the seed structure, instead of using the damage threshold of the material to be processed as the bottom line of the single pulse energy of the femtosecond laser, the single pulse energy of the femtosecond laser is adjusted to below the damage threshold of the material to be processed, even the lowest single pulse energy of the femtosecond laser is adjusted to 60% of the damage threshold of the material to be processed, thus, the seed structure with an ideal morphology is obtained, specifically as shown in (f) and (g) of FIG. 3.

(f) shows an electron microscope image of a seed structure obtained after continuously relaxing and stabilizing three times based on the initial seed structure shown in (c) three times under the condition that the single pulse energy of the femtosecond laser is adjusted to 83% of the damage threshold of the titanium dioxide. As shown in (f) of FIG. 3, the single pulse energy of the femtosecond laser is reduced to 83% of the damage threshold of the material to be processed, and the seed structure obtained by fabrication is an ideal flat-straight line.

(g) shows an electron microscope image of a seed structure obtained after continuously relaxing and stabilizing eight times based on (f) under the condition that the single pulse energy of the femtosecond laser is maintained at 83% of the damage threshold of the titanium dioxide. As shown in (g) of FIG. 3, if the fabrication is continued at the single pulse energy of the femtosecond laser, which is lower than the damage threshold of the titanium dioxide, for example, which is 83% of the damage threshold of the titanium dioxide, the seed structure obtained by fabrication has a stable linewidth and a straight morphology.

It can be understood that the present embodiment is the result obtained by conducting experiments with the titanium dioxide as an example. If other materials to be processed are used, it may be necessary to adjust the single pulse energy of the femtosecond laser to other ratios to obtain the desired effect, and the ratio refers to the ratio of the single pulse energy of the femtosecond laser to the damage threshold of the material to be processed, and is always less than 110%, and especially less than 100%.

What is more surprising to the present applicant is that the single pulse energy lower than the material damage threshold of the sample to be processed cannot cause damage to a region without the seed structure of the sample to be processed. Therefore, even if the morphology of the decorative pattern is restricted by whether or not the sample has the seed structure in the process of preparing the preset decorative pattern, even if the focus of the femtosecond laser deviates from the trajectory of the preset pattern, it will not cause undesirable defects in the sample to be processed, which will greatly improve the accuracy and yield of the decorative pattern.

Therefore, the step (3) specifically may comprise: based on the initial seed structure formed in the step (2), adjusting the single pulse energy of the femtosecond laser to be lower than the single pulse energy of the femtosecond laser used in the step (2) by the energy modulation system (3) so as to homogenize the near-field energy distribution near the initial seed structure obtained in the step (2), and for the titanium dioxide sheet, adjusting the single pulse energy of the femtosecond laser to be 60%-110% of the damage threshold $F_{th}$ of the material to be processed, preferably be 60% to 100%.

It can be seen that the method provided by the present application is different from a traditional method using femtosecond laser for lithography. Specifically, according to the traditional scheme using femtosecond laser for lithography, the single pulse energy of the femtosecond laser is used for controlling the linewidth in the process of lithography, is positively correlated with the linewidth, and remains constant after the screening of the single pulse energy of the femtosecond laser is completed, thereby ensuring that the linewidth of the obtained decorative pattern is constant. However, according to the scheme provided by the present application, the single pulse energy of the femtosecond laser changes in the process of preparing the seed structure, and specifically, the single pulse energy is high first and then low, thereby ensuring the obtained seed structure, that is, the linewidth of the obtained decorative pattern is constant.

In the present embodiment, the single pulse energy of the femtosecond laser can be simply adjusted through the energy modulation system, that is, the single pulse energy of the femtosecond laser can be adjusted in real time on demand.

Further, multiple femtosecond laser pulses, for example, 4 to 16 femtosecond laser pulses, are deposited on the initial seed structure obtained in the step (2) by the above-mentioned adjusted single pulse energy of the femtosecond laser, such that the obtained seed structure is continuously relaxed in the process of interacting with the femtosecond laser and finally has a stable morphology. The morphology stabilization described in the present application can be understood to mean that the morphology of the seed structure is changed as expected, no abnormal morphology is generated, and the decorative pattern with the stabilized morphology is the seed structure.

In the present embodiment, if multiple seed structures are set on the same sample to be processed, each seed structure can be prepared in sequence according to the step (2) and the step (3), or each seed structure can be prepared in turn step by step according to the step (2) and the step (3). For example, if two seed structures need to be set on the surface of the same sample to be processed, the first femtosecond laser pulses can be used respectively in sequence, then the second femtosecond laser pulses are used respectively in sequence, and afterwards the third femtosecond laser pulses are used respectively in sequence, . . . , until each of the structures has a stable morphology. Alternatively, firstly the first femtosecond laser pulse, the second femtosecond laser pulse, the third femtosecond laser pulse, . . . , may be used at a first preset seed structure until the first seed structure has a stable morphology, and then the first femtosecond laser pulse, the second femtosecond laser pulse, the third femtosecond laser pulse, . . . , may be used at a second preset seed structure until the second seed structure has a stable morphology.

In the present embodiment, it is preferable to prepare each seed structure sequentially according to the step (2) and the step (3) so as to avoid the problem of poor seed structure morphology caused by repeated positioning accuracy.

Step (4): Preparation of Non-Periodic Patterns and Periodic Patterns.

In the present application, the seeds obtained by step (3) are continuously updated in the lithography process, that is, one femtosecond laser pulse is deposited, the seed structure is updated once; the updated seed structure is part of the preset decorative pattern; and the morphology of the obtained seed structure is the preset decorative pattern when the lithography is completed.

In the traditional scheme of the femtosecond laser lithography, the linewidth of the decorative pattern is related to the power and scanning speed of the femtosecond laser. Specifically, the higher the power of the femtosecond laser, the slower the scanning speed, and the larger the number of pulses received at a certain point on the surface of the sample to be processed, the higher the energy received at the point, such that the linewidth of the decorative pattern formed is wider. However, the scheme provided by the present application produces results opposite to results of the conventional scheme, specifically, as shown in FIG. 4.

Figure 4:
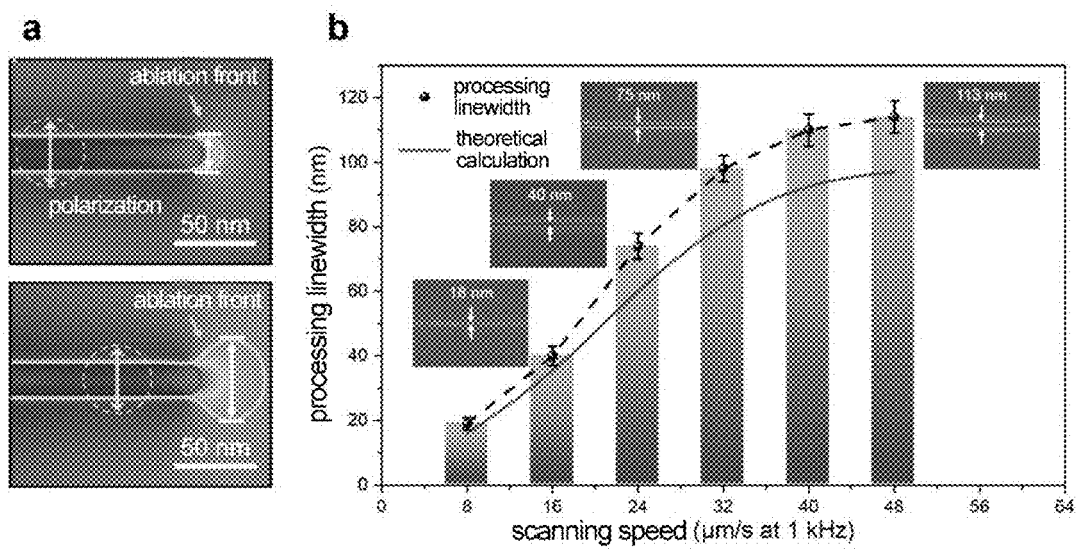
FIG. 4 is a processing width control method according to the method using femtosecond laser for nano precision preparation provided by the present invention; wherein (a) shows the effect of the distance from the center of the focused light spot to the front end of the seed structure on the titanium dioxide on the near-field light spot energy distribution, and all scales are 50 nm; wherein (b) shows the dependence of the processing linewidth on the titanium dioxide on the scanning speed, which is theoretically calculated and experimentally measured; the selected pulse energy is fixed at 104% of the damage threshold of the titanium dioxide, and the processing linewidth can be continuously adjusted from 18 nm to 113 nm by the scanning speed at the present fixed pulse energy.

FIG. 4 shows control factors affecting the linewidth in the present application, wherein (a) shows the effect of the distance between the focus of the femtosecond laser and the front end of the seed structure of the titanium dioxide sheet on the near-field energy distribution, and in (a), the scales of both upper and lower graphs are 50 nm; and (b) shows the dependence of the processing linewidth on the titanium dioxide sheet on the scanning speed, wherein bar graphs are experimental measurement result, line graphs are theoretical calculation results, and scanning electron microscope images are experimental measurement results.

The present applicant firstly selects the single pulse energy of the femtosecond laser for the preparation of the decorative pattern to be 104% of the titanium dioxide damage threshold, the sample obtained in (g) of FIG. 3 is tested by the single pulse energy, the result is shown in a scanning electron microscope image in (b) of FIG. 4, and the higher the scanning speed of the femtosecond laser, the larger the linewidth of the obtained decorative pattern. Further, the present applicant carries out theoretical calculation and simulation, and finds through results that simulation results are basically consistent with measured results, which indicates that the faster the scanning speed, the higher the energy at the front end of the seed structure. The abnormal phenomenon prompts the present applicant to further explore reasons thereof. The present applicant believes that this is related to factors such as the size of the femtosecond laser focus, the polarization angle of the femtosecond laser, and the distance between the femtosecond laser focus and the front end of the seed structure; and generally, the larger the range of the ablation front of the seed structure, the larger the linewidth of the final decorative pattern. Therefore, the present application adopts constant single pulse energy, i.e., constant power, and constant femtosecond laser focus size. The polarization angle of the femtosecond laser and the distance between the femtosecond laser focus and the front end of the seed structure are used as influence factors. The results shown in (a) of FIG. 4) are obtained by another theoretical simulation. In (a) of FIG. 4, a dotted circle indicates the range of the femtosecond laser focus; a double arrow indicates the polarization direction; a bar part represents the range of the seed structure; and a region delimited by arcs at the front end of the seed structure is the range of the ablation front.

It can be seen from an upper figure of (a) of FIG. 4 that if the distance between the femtosecond laser focus and the front end of the seed structure is relatively large, for example, greater than 100 nm, the range of the ablation front is relatively small and is basically the same as the width of the seed structure.

It can be seen from a lower figure of (a) of FIG. 4 that if the distance between the femtosecond laser focus and the front end of the seed structure is relatively small, for example, less than 50 nm, the near field generated by the current seed structure is stronger, the range of the ablation front is larger, and thus, the obtained linewidth is wider.

It can be speculated from (a) of FIG. 4 that the linewidth is indeed related to the polarization direction and the distance between the femtosecond laser focus and the front end of the seed structure. Based on this, the present applicant speculates that the fast scanning speed will reduce the difference between the movement speed of the femtosecond laser focus and the expansion speed of the front end of the seed structure. When the scanning speed is fast, the distance between the femtosecond laser focus and the front end of the seed structure is constant at a relatively small distance, and when the scanning speed is slow, the distance between the femtosecond laser focus and the front end of the seed structure is constant at a relatively large distance. Therefore, the faster the scanning speed, the larger the linewidth, and the slower the scanning speed, the smaller the linewidth.

It can be seen from (b) of FIG. 4 that the minimum processing linewidth obtained on the surface of titanium dioxide sheet by using the method provided by the present application is only 18 nm, and the wavelength of the femtosecond laser in the method is 800 nm, that is, the linewidth resolution is 18 nm/800 nm and is less than 1/40 of the wavelength.

Therefore, the scheme provided by the present application can select an appropriate scanning speed with constant single pulse energy according to the preset linewidth of the target decorative pattern, and the decorative patterns with the uniform linewidth can be obtained by scanning at the constant speed.

In the present embodiment, the titanium dioxide sheet is used as the sample to be processed, the single pulse energy of the femtosecond laser is 83% of the damage threshold of the titanium dioxide, the target linewidth is 18 nm-113 nm, and the scanning speed of the femtosecond laser focus may be 2 μm/s-50 μm/s.

Further, the scanning speed of 2 μm/s to 50 μm/s in the step (4) is relative to the pulse frequency of the femtosecond laser of 1 kHz, and the scanning speed is determined by the spatial deposition distance of two adjacent laser pulses, that is, the scanning speed is determined by the distance between the ablation front ends of the two adjacent laser pulses. Accordingly, for each X times increase in laser pulse frequency (X is between 1 and 10,000), the scanning speed can be correspondingly increased by X times in order to speed up the processing speed.

Further, the present applicant finds through (a) in FIG. 4 that the ablation front, i.e., the near-field enhancement direction, is perpendicular to the polarization direction of the femtosecond laser. Therefore, the method provided by the present application does not simply utilize the near field, but unexpectedly and cleverly combines a femtosecond laser technology with a near-field processing technology, eliminates the need for a physical probe manually installed on lithography device, and uses the seed structure created by the far-field laser on the surface of the material to be processed as a probe to excite the near field. Therefore, it is no longer necessary for the femtosecond laser to move strictly in accordance with the preset decorative pattern, and it is only necessary to adjust the polarization direction of the femtosecond laser at the front end of the seed structure, such that the polarization direction is perpendicular to the tangent direction of the preset pattern at the point, that is, the seed structure can be expanded according to the preset decorative pattern. The method provided by the present application does not need to control the movement precision of the probe, and has tolerance to the deviation of the movement trajectory of the femtosecond laser.

It is much easier to control the polarization direction of the femtosecond laser, and the polarization angle of the laser can be continuously and precisely adjusted by rotating the half-wave plates in the polarization control system. Therefore, the scheme provided by the present application can precisely control the orientation of the seed structure by precisely controlling the polarization direction of the femtosecond laser according to the preset decorative pattern, and obtains the preset decorative pattern.

Further, the orientation of the seed structure is arbitrary according to the scheme provided by the present application, and therefore, the curve morphology can be arbitrarily modulated according to the preset decorative pattern.

In the traditional scheme, the polarization angle of the femtosecond laser is not adjusted in real time. After the polarization angle is set to a specific angle at the beginning of lithography, the specific angle is kept constant in the lithography process, but the laser focus is moved by adjusting the sample stage, and thus, the specific decorative pattern is formed.

It can be seen that the step specifically comprises: maintaining the single pulse energy determined in the step (3), and adjusting the scanning speed of the focus of the femtosecond laser, such that the focus of the femtosecond laser scans the surface of the sample to be processed gradually in a third preset direction along a preset trajectory, and at the front end of the seed structure, controlling a polarization direction of the focus of the femtosecond laser to be perpendicular to a tangent direction of the focus on the preset decorative pattern.

As the method provided by the present application has no special limitation on the movement trajectory of the femtosecond laser focus, the most efficient scanning scheme can be adopted for different types of preset decorative patterns. For example, for the non-periodic patterns, such as the non-periodic decorative pattern shown in FIG. 8, the movement trajectory of the femtosecond laser focus can be made to coincide with the predetermined decorative pattern, but not limited to strict coincidence, but roughly coincident. At the front end of the seed structure, the polarization direction of the femtosecond laser can be adjusted to the direction. According to scheme, the process of lithographing the decorative pattern on the surface of the sample to be processed is similar to the process of "handwriting". For periodic structures, such as the periodic pattern shown in FIG. 9, as shown in (a) of FIG. 9, firstly the seed structures periodically arranged can be deposited, and then as shown in (b) of FIG. 9, serpentine scanning or grating scanning is carried out on the surface of the sample to be processed, which can improve the lithography speed. The lithography result is shown in (c) of FIG. 9. The process of lithographing the decorative pattern on the surface of the sample to be processed in the scheme is similar to the process of "printing by a printer".

Figure 8:
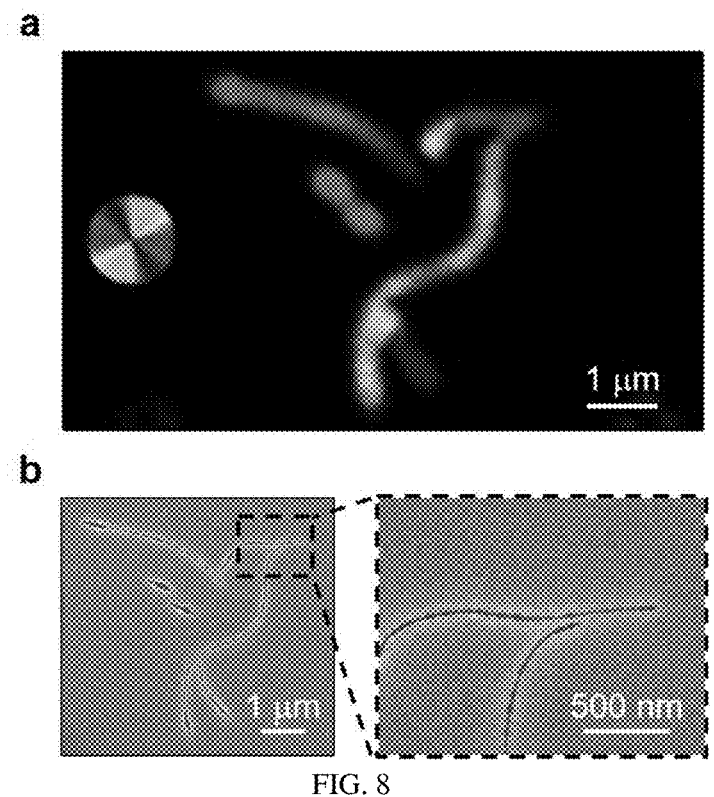
FIG. 8 shows the polarization optical effect of the nano groove structure according to the method using femtosecond laser for nano precision preparation provided by the present invention; wherein (a) is a birefringence pattern of the nano groove structure on the titanium dioxide with a phase delay of 9 nm measured by a polarized light microscopy; wherein (b) is an electron microscope image of the nano groove structure.

Specifically, for the non-periodic patterns as shown in FIG. 8, the step (4) may comprises: keeping the single pulse energy of the femtosecond laser determined in the step (3) unchanged, controlling the focus of the femtosecond laser to move along the preset pattern, controlling the polarization direction of the femtosecond laser to be perpendicular to the tangent direction of the preset decorative pattern on the ablation front, if the movement trajectory of the femtosecond laser focus is strictly coincident with the preset decorative pattern, controlling the polarization direction of the femtosecond laser to be perpendicular to the movement direction of the femtosecond laser focus.

Figure 9:
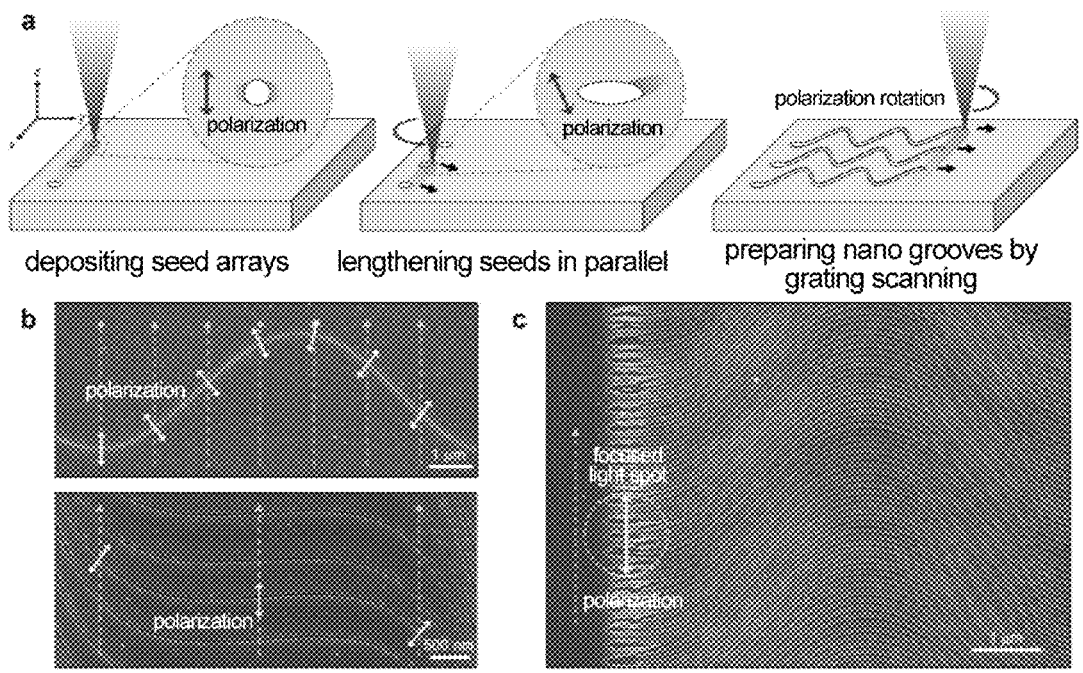
FIG. 9 is a demonstration of realizing the laser nano-parallel printing preparation by using femtosecond laser-induced directional near-field enhancement according to the present invention; wherein (a) is a schematic diagram of parallel deposition of seed structures and large-area nano laser printing by grating scanning; wherein (b-c) are electron microscope images of periodic nano groove structures prepared on the titanium dioxide by using polarization control and grating scanning.

For the periodic patterns as shown in FIG. 9, the step (4) may comprise: keeping the single pulse energy of the femtosecond laser determined in the step (3) unchanged, enabling the femtosecond laser focus to scan the surface of the sample to be processed along the serpentine or grating trajectory, as shown in (b) of FIG. 9, on various substructures, enabling the polarization direction of the femtosecond laser focus to be perpendicular to the tangent direction of the focus on the preset pattern, and thus, as shown in (c) of FIG. 9, the rapid batch preparation of the periodic nano linewidths on the same sample surface to be processed is realized.

It can be understood that in FIG. 9, the pattern in which two adjacent lines are approximately flat is used as an example for illustration, and the same scheme can also be used for other periodic decorative patterns.

Further, as the morphology of the decorative pattern is comprehensively affected by factors such as the pulse frequency, exposure time and scanning step length of the femtosecond laser, parameters such as the exposure time and scanning step length can be specifically set according to the expected decorative pattern morphology in combination with the pulse frequency of the femtosecond laser, such that the decorative pattern structure can form a continuous and stable linewidth, and the expected decorative pattern morphology is not damaged due to unintended damage caused by overexposure.

In the present implementation, the preset decorative pattern can be obtained on the surface of the sample to be processed only by adjusting the polarization direction of the femtosecond laser focus. As the single pulse energy of the femtosecond laser is lower than or slightly higher than the material damage threshold of the sample to be processed, the femtosecond laser can only carry out removal at locations where the seed structures are pre-deposited, that is, only at locations where the directional near-field enhancement can be caused, and no damage is formed on the rest of the sample. Specifically, the laser locus always maintains serpentine scanning or grating scanning, and while the obtained patterns are periodic personalized decorative patterns.

The method provided by the present application uses the seed structure itself as a probe for continuing near-field fabrication without using additional physical near-field probes, which not only reduces the difficulty of controlling the probe displacement, but also can improve the accuracy of lithography and is tolerant to the movement error of the probe. Further, the method provided by the present application can obtain the linewidth with accuracy of near-field lithography by a method similar to far-field control of spot, is easy to operate, and does not require the use of complex and expensive optical device, and the cost of lithography is reduced thereupon.

The present invention will be further described with reference to the following embodiments.

Embodiment 1

A nano pattern with birefringence is prepared on the titanium dioxide with the method using femtosecond laser for nano precision preparation.

In the present embodiment, the birefringence refers to a phenomenon that the refractive index of light changes with the propagation direction of light, the vibration direction of a photoelectric field and the relative orientation of a medium in the process of propagation of the light in a medium.

Initial damage nanoholes formed by using femtosecond laser multiphoton excitation are used as the seed structure, and the energy and polarization state of subsequent laser pulses are adjusted in real time, such that uniform and directional optical near-field enhancement is generated near the seed structure, and finally the high-precision removal of processing materials is realized. The polarization states of the laser pulses are adjusted in real time according to the geometric structures of pre-designed nano grooves, such that the polarization of the laser pulses is always and locally perpendicular to the designed nano grooves, and thus, any given geometric pattern of the nano groove is prepared.

The device used in the present embodiment is shown in FIG. 1, the sample to be processed is a titanium dioxide flat sheet, and the size of the sample to be processed is 1 cm×1 cm.

In the present embodiment, the laser emitted from the femtosecond laser device has a center wavelength of 800 nm, a pulse width of 150 fs, and a repetition frequency of 1 kHz. After the laser beam is subjected to beam expansion by the concave lens L1 and the first convex lens L2, the diameter of the light spot is enlarged by two times. All the half-wave plates are the 3010030241 air-gap zero-order wave plates produced by Union Optic, Inc., and the Glan prisms are the PGL5010 Glan lasers produced by Union Optic, Inc. The focusing objective lens used for laser processing is the flat-field achromatic objective lens with the numerical aperture of 0.8 and a magnification of 80 times.

The method using femtosecond laser to prepare nano precision structure is used for preparing the nano patterns with the birefringence on the titanium dioxide and comprises the specific steps of:

(1) Leveling of the Sample

Firstly fixing the sample to be processed to the motion stage with the regulating device; then, turning on the optical shutter in the processing optical path, focusing the laser by the objective lens, and using the computer to control the Z-axis movement of the motion stage, such that the sample sheet is close to the objective lens but not in contact with the objective lens; then, slowly raising the vertical height of the sample sheet, such that the interface slowly approaches the focus until a clear sample surface is observed in the real-time monitoring device; then, controlling the motion stage to move horizontally by 2 cm in the long-axis direction of the sample sheet, and regulating the regulating device of the motion stage, such that when the motion stage moves, the laser focus is always focused on the interface without relative movement, and the morphology of the light spot in the processing real-time monitoring device remains unchanged; and then controlling the motion stage to move horizontally by 2 cm in the short-axis of the sample sheet, and regulating the regulating device of the sample table, such that when the motion stage moves, the laser focus is always focused on the interface without relative movement, the morphology of the light spot in the processing real-time monitoring device remains unchanged, and at this time, the sample table to be processed has been leveled.

(2) Preparation of the Seed Structure

Firstly, the femtosecond laser emitted from the laser device is subjected to light spot beam expansion by the beam expander consisting of the concave lens L1 and the first convex lens L2, then passes through the energy modulation system consisting of the first half-wave plate H1 and the first Glan prism P1, and afterwards passes through a first total-reflection mirror M1 and the polarization control system consisting of the second Glan prism P1 and the second half-wave plate H2 sequentially, such that a light beam vertically enters the galvanometer; and then, the light beam reflected by the galvanometer passes through the 4f system consisting of the second convex lens L3 and the third convex lens L4, and the light spot entering the galvanometer is projected onto a front of the processing objective lens in a ratio of 1:1, and finally is focused on the surface of the sample to be processed.

Firstly, the single-pulse damage threshold of the titanium dioxide is measured to be 15.6 nJ, and then the first half-wave plate in the energy modulation system is rotated to adjust the energy to 104% of the material damage threshold. The processing program is initiated, and the galvanometer projects the light spot onto the sample surface through the 4f system. After two pulses are deposited on the sample surface by the energy being 104% of the material damage threshold, the program automatically reduces the energy of subsequent pulses to 83% of the material damage threshold by rotating the first half-wave plate H1, and six pulses are continuously deposited on the sample surface through the exposure time. Finally, the preparation of the seed structure is completed.

(3) Direct Writing of Nano Groove Structures

After completing the preparation of the seed structure, the program automatically adjusts the laser polarization of an incidence objective lens by rotating the second half-wave plate H2 in the polarization control system, and then rotates the direction of near-field enhancement adjacent to the seed structure. Then, the computer jointly controls the movement of the focused light spot and the rotation of the laser polarization, such that the pulse polarization is always and locally perpendicular to the pre-designed geometric structure so as to achieve the dynamic near-field enhancement, and thus, the far-field high-resolution laser direct writing is achieved. At the same time, the program automatically adjusts the laser pulse energy to 83% of the material damage threshold $F_{th}$, such that the scanning of the light spot does not cause damage in regions without pre-deposited seeds. At the same time, the seed structure still continues to lengthen with the movement of the light spot and the change of the laser polarization state due to the near-field enhancement near the seed structure. The process of (1-3) above should be repeated for each part of the nano groove structure until the processing of the designed pattern is finally completed. In the present embodiment, the moving speed of the light spot is 8 μm/s.

The computer jointly controls the movement of the focused light spot and the rotation of the laser polarization, such that the pulse polarization is always and locally perpendicular to the pre-designed geometric structure so as to achieve the dynamic near-field enhancement, and thus, the far-field high-resolution laser direct writing of any given two-dimensional pattern is achieved.

It can be seen from FIG. 2 that the morphology of the seed structure can be constrained by adjusting the energy of the laser pulse. At the same time, benefiting from the near-field enhancement effect, even if the pulse energy is reduced to 83% of the material damage threshold, the seed structure can still be extended while the energy does not cause material damage at the remaining locations.

It can be seen from FIG. 3 that the dependence of the experimentally observed morphology of the seed structure on the incident pulse energy exactly matches with the theoretical calculation.

It can be seen from FIG. 4 that the width of the nano groove structure can change with the pulse energy and scanning speed, which facilitates the preparation of various structures/devices with different accuracy requirements at maximum efficiency.

In particular, the present applicant tests the following properties of the method provided by the present application, and the results are as follows.

1.1 Robustness Test

The sample used in this test is a titanium dioxide sheet with a size of 1 cm×1 cm, the method used is the same as the method in the embodiment 1, and results are shown in FIG. 5.

Figure 5A:
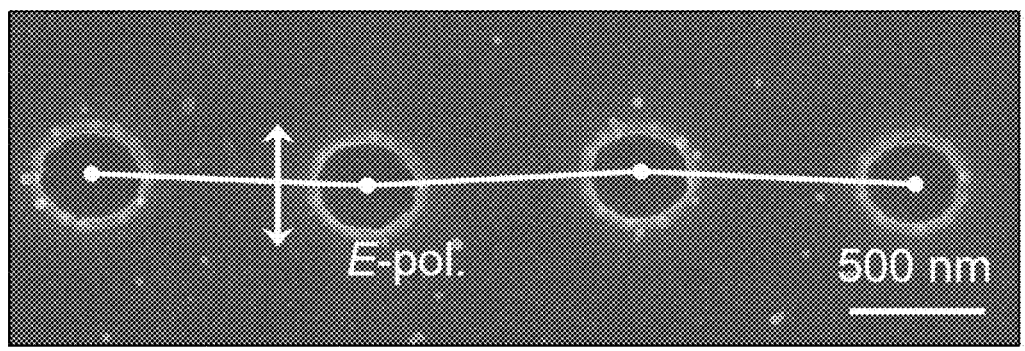
FIG. 5 is the robust display according to the method using femtosecond laser for nano precision preparation provided by the present invention; wherein (a) shows fluctuation errors of the movement trajectory of the light spot in the process of the processing through a single pulsed ablation pit discretely deposited at high energy; wherein (b) shows that the nano grooves directly written by near-field enhancement jointly controlled by means of the combination of polarization, light spot movement and the seed structure have almost no structural fluctuations, that is, have very strong robustness, and scales are all 50 nm.
Figure 5B:
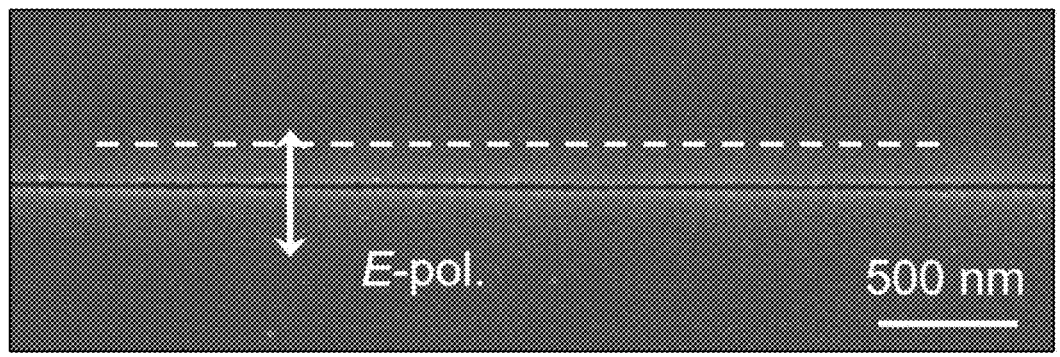

FIG. 5a and FIG. 5b show the robustness of the method provided by the present application, where the scales of FIG. 5a and FIG. 5b are both 50 nm. FIG. 5a shows a distribution diagram of multiple femtosecond laser pulse ablation pits obtained by discrete continuous deposition at high single pulse energy. As shown in FIG. 5a, there are fluctuation errors in the movement trajectory of the femtosecond laser spot in the process of processing. FIG. 5b shows the scheme provided by the present application, that is, the morphology of the obtained nano groove is directly written by the near-field enhancement, the near-field enhancement is cooperatively controlled by laser polarization, femtosecond laser focus movement and the seed structure, and the three factors correct each other. It can be seen from FIG. 5b that the nano groove obtained according to the scheme provided by the present application has almost no structural fluctuations, that is, has strong robustness.

It can be seen from FIG. 5 that the method using femtosecond laser for nano-precision preparation is determined by the laser polarization, the movement trajectory of the light spot, and the existing seed structure at the same time. The directly written nano pattern is not sensitive to slight errors of polarization, the movement trajectory of the light spot or a movement platform during processing, and has very strong robustness.

1.2 Angular Resolution Test

Figure 6:
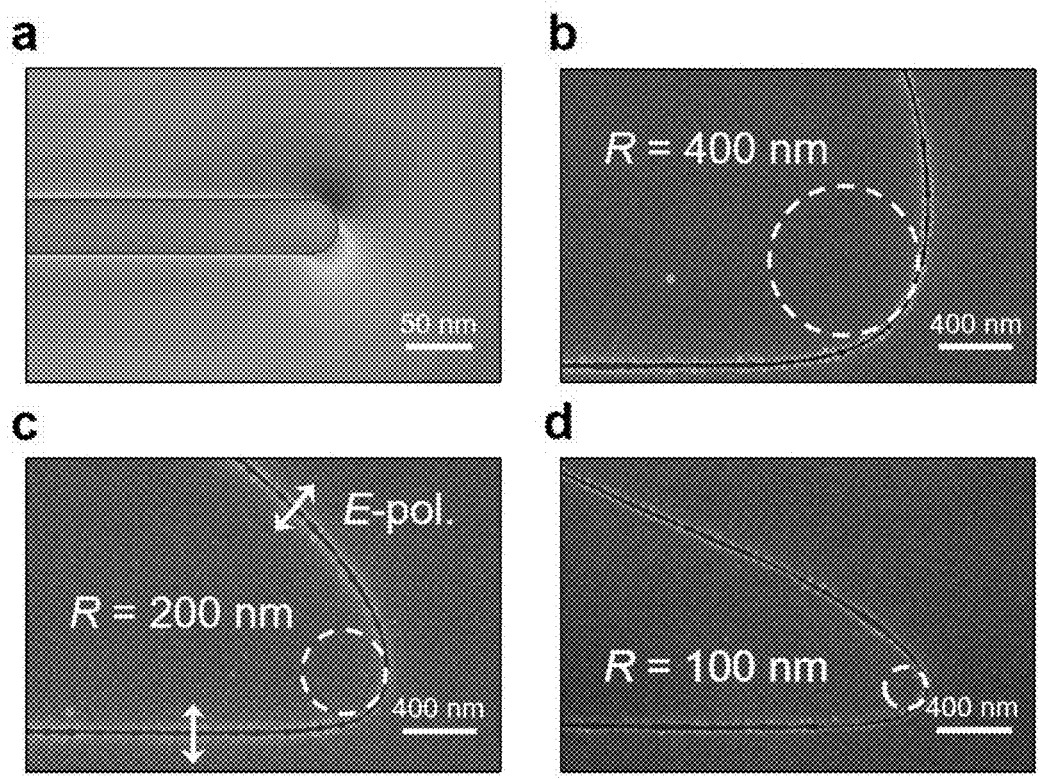
FIG. 6 is the angular resolution display according to the method using femtosecond laser for nano precision preparation provided by the present invention; wherein (a) is a theoretical calculation diagram of polarization-controlled near-field spot rotation, and the scale is 50 nm; and wherein (b-d) shows the angular resolution of processing on the titanium dioxide according to the method, and as shown in the figure, the radius of curvature at a corner can continuously change from 400 nm to 100 nm.

The sample used in this test is a titanium dioxide sheet with a size of 1 cm×1 cm, the method used is the same as the method in the embodiment 1, and results are shown in FIG. 6.

FIG. 6 shows the angular resolution of a decorative pattern obtained by the method provided by the present application; wherein (a) shows a theoretical calculation chart of the laser polarization controlling the rotation of the near-field femtosecond laser focus with a scale of 50 nm; (b) shows a scanning electron microscope image of a curve decorative pattern prepared by the method according to the present application, and the radius of curvature of a curve at a corner shown in the figure is 400 nm; (c) shows a scanning electron microscope image of a curve decorative pattern prepared by the method according to the present application, and the radius of curvature of a curve at a corner shown in the figure is 200 nm; and (d) shows a scanning electron microscope image of a curve decorative pattern prepared by the method according to the present application, and the radius of curvature of the curve at a corner shown in the figure is 100 nm.

It can be seen from FIG. 6 that the method using femtosecond laser for nano-precision preparation has relatively high angular resolution and can achieve continuous change of the radius of curvature at a bend from 400 nm to 100 nm.

1.3 Proximity Effect Test

Figure 7:
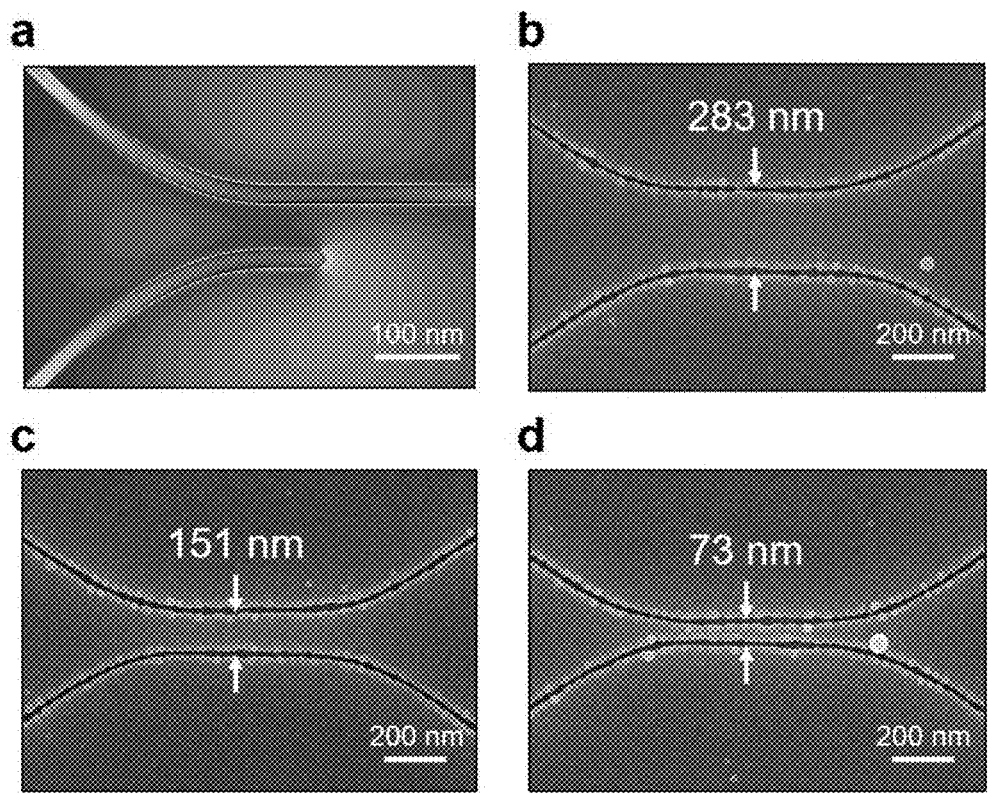
FIG. 7 is the absence-of-proximity effect display according to the method using femtosecond laser for nano precision preparation provided by the present invention; wherein (a) is a theoretical calculation diagram of near fields near adjacent nano structures sequentially and directly written, and a scale is 50 nm; wherein (b-d) shows the avoidance of a proximity effect on the titanium dioxide according to the method, and as shown in the figure, the spacing between the adjacent nano grooves can continuously change from 283 nm to 73 nm, and the resolution reaches 1/11 of the wavelength.

The sample used in this test is a titanium dioxide sheet with a size of 1 cm×1 cm, the method used is the same as the method in the embodiment 1, and results are shown in FIG. 7.

FIG. 7 shows the results of avoiding the proximity effect by the method according to the present application.

(a) shows a theoretical calculation chart of the field intensity distribution of near-field photoelectric fields of adjacent nano grooves obtained by successive direct writing in the method provided by the present application, a longer line is a line obtained in the prior processing, a shorter line is a line obtained in the later processing, and a scale is 100 nm; (b) shows a scanning electron microscope image of the morphologies of the two adjacent nano grooves prepared by using the scheme according to the present application, and the minimum spacing of the two adjacent nano grooves is 283 nm; (c) shows a scanning electron microscope image of the morphologies of the two adjacent nano grooves prepared by using the scheme according to the present application, and the minimum spacing of the two adjacent nano grooves is 151 nm; and (d) shows a scanning electron microscope image of the morphologies of the two adjacent nano grooves prepared by using the scheme according to the present application, and the minimum spacing of the two adjacent nano grooves is 73 nm.

As shown in (b) to (d) of FIG. 7, the spacing between the adjacent nano grooves can continuously change from 283 nm to 73 nm, and the minimum line spacing resolution reaches $1/11$ of the wavelength.

The present applicant believes that each groove is obtained by near-field fabrication in the method provided by the present application, and therefore, the proximity effect in traditional optical processing can be effectively avoided.

It can be seen from FIG. 7 that the method using femtosecond laser for nano-precision preparation can effectively avoid the proximity effect and can achieve continuous change of the spacing between the adjacent structures from 283 nm to 73 nm without any mutual influence.

1.4 Polarized Optical Effect Test

The sample used in this test is a titanium dioxide sheet with a size of 1 cm×1 cm, the method used is the same as that of the embodiment 1, and results are shown in FIG. 8.

FIG. 8 shows the optical effect of a polarization direction according to the method provided by the present application; wherein (a) shows a birefringence pattern of the nano groove structure on the titanium dioxide with a retardance of 9 nm measured by a polarized light microscopy, and (b) shows an electron microscope image of the nano groove structure shown in (a).

It can be seen from FIG. 8 that a birefringent structure prepared on the surface of titanium dioxide by the method using femtosecond laser for nano precision preparation has a good birefringence effect and can make the birefringent slow axis of the structure change smoothly with space.

Embodiment 2

Periodic nano groove arrays are prepared on the surfaces of titanium dioxide and quartz glass by the method using femtosecond laser for nano precision preparation.

Large-area nano structures of any given shape can be prepared rapidly by periodically depositing seed structures and adjusting the energy and polarization state of the laser pulse in real time.

Periodic nano groove arrays are prepared on the surfaces of titanium dioxide and quartz glass by the steps of:

(1) Leveling of the Sample

Same as the embodiment 1, wherein the light spot is expanded by 2 times after the femtosecond laser is subjected to beam expansion.

(2) Preparation of the Seed Structure

Same as the embodiment 1, the seed structure can be prepared periodically on the surface of the sample.

(3) Preparation of Large-Area Nano Structures by Grating Scanning

During processing on the surface of the titanium dioxide, reducing the energy of the laser pulse to be within the range of 83% of the material damage threshold (for quartz glass, reducing the pulse energy to 92% of the damage threshold), making the light spot carry out grating scanning in the periodic direction of a seed array with the scanning speed of 20 µm/s (for quartz glass, the scanning speed is changed to 10 µm/s), meanwhile constantly changing the polarization of the laser pulse by using the polarization control system according to the morphology of the preset nano groove, such that the laser polarization at each scanning is exactly perpendicular to the tangent line of the preset nano groove, and thus, large-area periodic nano groove structures can be quickly prepared. As the single pulse energy is reduced below the material damage threshold, the material removal process occurs at and only at locations where the seed structures are pre-deposited, that is, those positions that can cause directional near-field enhancement. For regions where the seed structures are not pre-deposited, subsequent grating scanning do not cause any material damage.

FIG. 9 shows the results of lithography on the surface of the titanium dioxide sheet according to the method of the present application; wherein (a) shows a flow diagram of depositing multiple seed structures in parallel and performing large-area nano lithography on the surface of the titanium dioxide sheet by using a grating scanning strategy; (b) shows the relationship between the polarization direction of the femtosecond laser and the tangential direction of the preset decorative pattern at a point; (c) shows a scanning electron microscope of the preparation of the periodic groove structures according to the scheme provided by the present application, the scanning mode of the femtosecond laser is grating scanning, and the decorative patterns of the periodic grooves are controlled by adjusting the polarization direction of the femtosecond laser in real time.

It can be seen from FIG. 9 that the large-area periodic nano groove structures can be rapidly prepared on the surface of the titanium dioxide by a combination of parallel deposition of seeds, grating scanning and polarization modulation.

Figure 10:
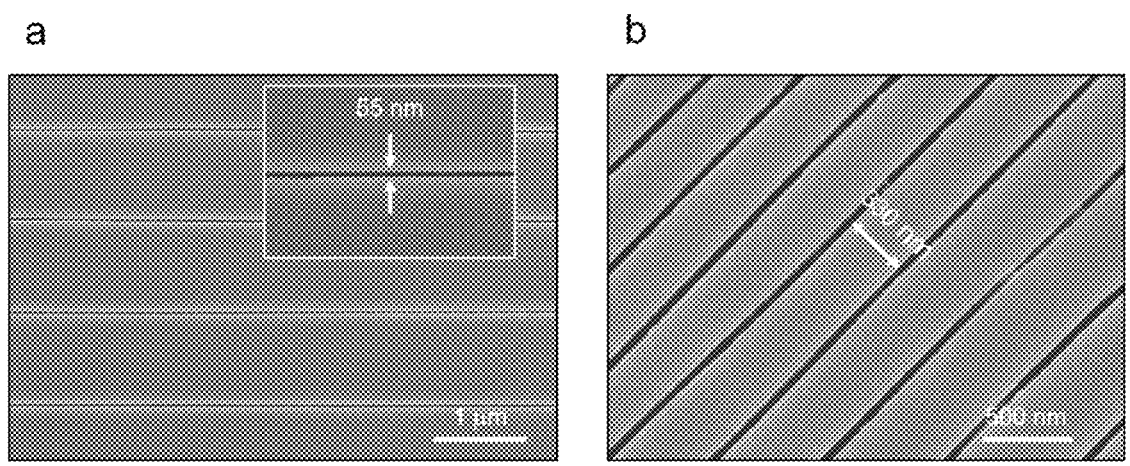
FIG. 10 is a nano grating structure prepared on the surface of quartz glass according to the method using femtosecond laser for nano precision preparation provided by the present invention; wherein (a) is a prepared nano grating with a period of 1 μm; and wherein (b) is a prepared nano grating with a period of 330 nm.

FIG. 10 shows a scanning electron microscope image of nano gratings prepared on the surface of the quartz glass according to the method provided by the present application; wherein (a) shows the nano grating with a period of 1 µm and a linewidth of 55 nm, and wherein (b) shows the prepared nano grating with a period of 330 nm.

It can be seen from FIG. 10 that the above-mentioned process of the titanium dioxide is also applicable to the quartz glass. More generally, in terms of the principle of near-field enhancement, the method using femtosecond laser for nano-precision preparation provided by the present invention only requires the difference in the refractive index between the sample and air to generate directional near-field enhancement, and therefore, the above principle should be applicable to most materials.

For example, the above principle can be applied to materials such as lithium niobate, fused silica or yttrium aluminum garnet crystal (YAG).

It can be seen from the above embodiments that the method provided by the present application uses the nature of the femtosecond laser capable of performing multiphoton excitation to form initial damage nanoholes on the surface of the material to be processed, and uses the initial damage nanoholes as the seed structures, the uniform and directional optical near-field enhancement is generated at the front end of the seed structure by real-time modulation of the single pulse energy and polarization states of the subsequent femtosecond lasers, thus, the continuous nano linewidth decorative pattern is formed based on the seed structure, and the high-precision removal of the material to be processed is realized. Benefiting from the high localization of energy of the near-field femtosecond laser locus in the sample-air interface, the present application uses femtosecond laser pulses having the wavelength of 800 nm to achieve a machining accuracy having the minimum linewidth of only 18 nm, and the linewidth resolution reaches $\frac{1}{40}$ of the wavelength.

The present application is described in detail above in conjunction with specific embodiments and exemplary examples, but these descriptions should not be construed as a limitation on the present application. It is understood by those skilled in the art that various equivalent substitutions, modifications or improvements can be made to the technical scheme and implementations of the present application without departing from the spirit and scope of the present application, all of which fall within the scope of the present application. The protection scope of the present application shall be subject to the appended claims.

What is claimed is:

1. A method using femtosecond laser for nano precision preparation, comprising the following steps:

(1) leveling of a sample;

comprising: firstly fixing the sample to be processed to a motion stage with an adjustment device; then turning on an optical shutter in a processing optical path, focusing the laser by an objective lens, and focusing the femtosecond laser on the surface of the sample to be processed by adjusting the height of the motion stage; then controlling the motion stage to move horizontally along the long axis of a sample sheet by 2 cm, adjusting the adjustment device of the motion stage, such that when the motion stage moves, the laser focus is always focused on the interface between the surface of the sample and the air without relative movement and the morphology of a light spot in a processing real-time monitoring device remains unchanged; controlling the motion stage to move horizontally along the short axis of the sample piece by 2 cm, and adjusting the adjustment device of the motion stage, such that when the motion stage moves, the focus of the laser is always focused on the interface without relative movement, and the morphology of the light spot in the processing real-time monitoring device remains unchanged, and at this time, a sample table to be processed has been leveled;

(2) generation of an initial seed structure;

comprising: firstly the femtosecond laser emitted from the laser device is subjected to light spot beam expansion by a beam expander consisting of a concave lens L1 and a first convex lens L2, then passes through an energy modulation system consisting of a first half-wave plate H1 and a first Glan prism P1, and afterwards passes through a first total-reflection mirror M1 and a polarization control system consisting of a second Glan prism P1 and a second half-wave plate H2 sequentially, and a light beam is enabled to vertically enter a galvanometer; then the light beam reflected by the galvanometer passes a 4f system consisting of a second convex lens L3 and a third convex lens L4, and a light spot entering the galvanometer is projected onto a front of a processing objective lens in a ratio of 1:1, and finally is focused on the surface of the sample to be processed; and the single pulse energy of the laser is selected to be within the range of 100% and 110% of a material damage threshold $F_{th}$, and the exposure time is accurately controlled, such that two pulses are deposited on the surface of the sample to complete the preparation of the seed structure;

(3) relaxation and stabilization of the seed structure;

comprising: after completing the generation of the initial seed structure according to the step (2), rotating the angle of the first half-wave plate H1 relative to the first Glan prism P1 in the energy modulation system, such that the energy of subsequent pulses from a third pulse is reduced to 60%-110% of the material damage threshold $F_{th}$ so as to homogenize the near-field energy distribution near the structure; and then, keeping the pulse energy at this level, and continuously depositing 4 to 16 pulses on the seed structure by controlling the exposure time, such that the morphology of the seed structure is continuously relaxed in the process of interacting with the laser and finally is stabilized, that is, the morphology of the seed does not change any more; and (4) laser direct writing of high-precision two-dimensional patterns;

comprising: after completing the relaxation and stabilization of the seed structure according to the step (3), rotating the second half-wave plate H2 in the polarization control system to adjust the polarization of the laser entering the objective lens, thereby changing the direction of the near-field enhancement generated at the seed structure; controlling the movement of a focused light spot and the rotation of the laser polarization jointly by a computer to enable the pulse polarization to be always and locally perpendicular to a pre-designed geometric structure, such that the dynamic near-field enhancement can be realized, and then the laser direct writing of the far-field high resolution of any given two-dimensional pattern is realized; at this time, the movement of the light spot of the laser and the trajectory of the pattern coincide; meanwhile, adjusting the pulse energy of the laser to be within the range of 60% to 110% of the damage threshold $F_{th}$, adjusting a relative position of the focused light spot and an ablation front by adjusting the scanning speed of the light spot of the laser to change within the range of 2 μm/s to 50 μm/s, and then adjusting the width of a near-field light spot to achieve different direct writing linewidths from 18 nm to 200 nm; and (5) laser printing of high-precision periodic nano grooves:

comprising: reducing the energy of the laser pulse to be within the range of 60% to 110% of the material damage threshold, preferably within the range of 60% to 100%, and enabling the light spot to perform grating scanning in a periodic direction of a seed array, meanwhile constantly changing the polarization of the laser pulse by using the polarization control system according to the morphology of the preset nano grooves, such that the laser polarization at each scanning is exactly perpendicular to tangent lines of the preset nano grooves, and thus, large-area periodic nano groove structures can be quickly prepared.

2. The method using femtosecond laser for nano precision preparation according to claim 1, wherein the processing real-time monitoring device in the step (1) is a microscopic imaging system formed jointly by a camera, a fourth convex lens L5, an illumination light source and a fifth convex lens L6.

3. The method using femtosecond laser for nano precision preparation according to claim 1, wherein the laser emitted by the femtosecond laser in the step (2) has a center wavelength of 800 nm, a pulse width of 150 fs, and a repetition frequency of 1 kHz; the diameter of a light spot is enlarged by 2-4 times after a laser beam is expanded by a concave lens L1 and a first convex lens L2; the objective lens used for laser processing is a flat-field achromatic objective lens with a numerical aperture of 0.8 and a magnification of 80 times.

4. The method using femtosecond laser for nano precision preparation according to claim 1, wherein the material damage threshold $F_{th}$ in the step (2) is measured according to the following manner: adjusting the single pulse energy of incident laser to be $E_1, E_2, \ldots, E_k, \ldots,$ and $E_n$ for performing the single pulse ablation on the surface of the material, and measuring the diameters $D_1, D_2, \ldots, D_k, \ldots, D_n$ of corresponding ablation pits under an electron microscope; and fitting the relationship between the diameters of the ablation pits and the single pulse energy through the formula $D_k^2 = 2w_0^2[\ln(E_k) - \ln(F_{th})]$, thereby determining that an undetermined coefficient is focused on Gaussian light spot beam waist $w_0$ and the material damage threshold $F_{th}$.

5. The method using femtosecond laser for nano precision preparation according to claim 1, wherein the energy of subsequent pulses from the third pulse is reduced to 60%-100% of the material damage threshold $F_{th}$.

* * * * *